US012147901B2

(12) United States Patent
Gao et al.

(10) Patent No.: US 12,147,901 B2
(45) Date of Patent: Nov. 19, 2024

(54) TRAINING AND APPLICATION METHOD OF A MULTI-LAYER NEURAL NETWORK MODEL, APPARATUS AND STORAGE MEDIUM

(71) Applicant: CANON KABUSHIKI KAISHA, Tokyo (JP)

(72) Inventors: Hongxing Gao, Beijing (CN); Wei Tao, Beijing (CN); Tsewei Chen, Tokyo (JP); Dongchao Wen, Beijing (CN); Junjie Liu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 644 days.

(21) Appl. No.: 16/721,624

(22) Filed: Dec. 19, 2019

(65) Prior Publication Data

US 2020/0210844 A1    Jul. 2, 2020

(30) Foreign Application Priority Data

Dec. 29, 2018  (CN) .......................... 201811631475.5

(51) Int. Cl.
*G06N 3/04*    (2023.01)
*G06N 3/084*    (2023.01)

(52) U.S. Cl.
CPC .............. *G06N 3/084* (2013.01); *G06N 3/04* (2013.01)

(58) Field of Classification Search
CPC .................................. G06N 3/084; G06N 3/04

USPC .......................................................... 706/25
See application file for complete search history.

(56) References Cited

U.S. PATENT DOCUMENTS

| 2017/0032222 | A1* | 2/2017 | Sharma | ................ G06V 10/449 |
| 2020/0167929 | A1* | 5/2020 | Wang | ...................... G06T 7/194 |
| 2020/0167930 | A1* | 5/2020 | Wang | ........................ G06T 7/11 |

FOREIGN PATENT DOCUMENTS

| CN | 108388537 A | 8/2018 |
| WO | 108171323 A | 6/2018 |

OTHER PUBLICATIONS

Yuka Oba, et al.;"Study of Hardware-oriented High-precision Model Based on Binarized Neural Network;" IEICE Technical Report, Japan, The Institute of Electronics, Information and Communication Engineers, vol. 118, No. 63, pp. 21-26, ISSN 2432-6380.
Zhezhi He, et al.;"Optimize Deep Convolutional Neural Network with Ternarized Weights and High Accuracy;" Department of Electrical and Computer Engineering, University of Central Florida, Orlando, 32816 USA; Jul. 20, 2018; pp. 1-8.

* cited by examiner

*Primary Examiner* — Tiffany P Young
(74) *Attorney, Agent, or Firm* — Canon U.S.A., Inc. IP Division

(57) ABSTRACT

The present disclosure provides a training and application method of a multi-layer neural network model, apparatus and a storage medium. In a forward propagation of the multi-layer neural network model, the number of input feature maps is expanded and a data computation is performed by using the expanded input feature maps.

36 Claims, 23 Drawing Sheets

PRESENT DISCLOSURE

FORWARD PROPAGATION

INPUT FEATURE MAPS AFTER EXPANSION OF ith LAYER

TRAINING AND APPLICATION METHOD OF A MULTI-LAYER NEURAL NETWORK MODEL, APPARATUS AND STORAGE MEDIUM

BACKGROUND OF THE INVENTION

Field of the Invention

The present disclosure relates to a modeling field for a multi-layer neural network, particularly relates to a method of causing a simplified multi-layer neural network model to enhance precision/performance.

Description of the Related Art

In recent years, a modeling based multi-layer neural network model has been widely applied into computer services such as face detection, pedestrian/vehicle detection and face recognition, as shown in FIG. 1. In order to enhance precision of the services, network models are designed more and more deeply (the number of layers is large) and more and more widely (the number of output channels in the layer is large), for example a high depth network model such as VGGNet, ResNet and Xception. Since the high depth network model has such disadvantages that the calculation amount is large and the processing speed is slow, it is difficult to be applied into devices of which resources are limited such as smart phone; meanwhile, it is also difficult to be applied into dedicated hardware of which memory is limited. In order to solve this issue, the following methods for compressing and speeding the network model are proposed.

1. Network Pruning. This method causes weights of filters become sparse by setting a part of parameters in filters to 0, or decrease the number of filters by directly removing a part of filters, so as to attain a purpose of simplifying the network model. Although the Network Pruning can efficiently simplify the network model, it is difficult to determine which filters in a convolutional layer are removable, so that the practical application of the Network Pruning is limited.

2. Parameter Quantization. This method decreases the storage space of the network model and enhances the operation speed by reducing indication precision of parameters in the filters. For example, full precision indicated by 32 bits is quantized into binary precision indicated by 2 bits. This method can drastically reduce the storage space occupied by the network model; however the reduction of the indication precision of the parameters will cause the performance of the network model become worse.

SUMMARY OF THE INVENTION

According to one aspect of the present disclosure, it is provided an application method of a multi-layer neural network model, which comprises of: inputting data corresponding to task requirements to the multi-layer neural network model; expanding, for at least one layer in the network model, the number of input feature maps of the layer and performing data computation of the layer by using the expanded input feature maps; computing the data in each layer of the network model.

According to another aspect of the present disclosure, it is provided an application method of a multi-layer neural network model, which comprises of: inputting data corresponding to task requirements to the multi-layer neural network model; computing the data in each layer from top to bottom in the network model; wherein following processing is executed on filters in at least one layer in the network model: dividing channels in the filters into groups, wherein the channels that are computed with the same input feature map during the training of the network model belong to the same group; accumulating filter channels in the same group to obtain the accumulated filter channels for data computation with input feature maps.

According to another aspect of the present disclosure, it is provided a training method of a multi-layer neural network model, which comprises of: expanding, for at least one of layers of the multi-layer neural network model to be trained, the number of input feature maps of the layer and performing data computation of the layer by using the expanded input feature maps, in a forward propagation; determining gradient values of input feature maps before expansion by using gradient values of the expanded input feature maps and training the network model by using the gradient values of input feature maps before expansion, in a back propagation.

According to another aspect of the present disclosure, it is provided an application method of a multi-layer perception network model, which comprises of: inputting data corresponding to task requirements to the multi-layer perception network model; expanding, for at least one layer in the network model, the number of input nodes of the layer and performing data computation of the layer by using the expanded input nodes; computing the data in each layer of the network model.

According to another aspect of the present disclosure, it is provided an application method of a multi-layer perception network model, which comprises of: inputting data corresponding to task requirements to the multi-layer perception network model; computing the data in each layer of the network model, wherein following processing is executed on connection coefficients in at least one layer in the network model: dividing connection coefficients into groups, wherein the connection coefficients that are computed with the same input node during the training of the network model belong to the same group; accumulating connection coefficients in the same group to obtain the accumulated connection coefficients for computation with input nodes.

According to another aspect of the present disclosure, it is provided a training method of a multi-layer perception network model, which comprises of: expanding, for at least one layer of the multi-layer perception network model to be trained, the number of input nodes of the layer and performing computation of the layer by using the expanded input nodes, in a forward propagation; calculating gradient values of nodes before expansion by using gradient values of the expanded nodes and training the multi-layer perception network model by using the gradient values of nodes before expansion, in a back propagation.

According to another aspect of the present disclosure, it is provided an application apparatus of a multi-layer neural network model, which comprises: an input unit configured to input data corresponding to task requirements to the multi-layer neural network model; a first expansion unit configured to expand, for at least one layer in the network model, the number of input feature maps of the layer; a computing unit configured to perform data computation of the layer by using the expanded input feature maps until computation in each layer of the network model is completed.

According to another aspect of the present disclosure, it is provided an application apparatus of a multi-layer neural network model, which comprises: an input unit configured to input data corresponding to task requirements to the multi-layer neural network model; a computing unit configured to compute the data in each layer in the network model; wherein following processing is executed on filters in at least one layer in the network model: dividing channels in the filters into groups, wherein the channels that are computed with the same input feature map during the training of the network model belong to the same group; accumulating filter channels in the same group to obtain the accumulated filter channels for data computation with input feature maps.

According to another aspect of the present disclosure, it is provided a training apparatus of a multi-layer neural network model, which comprises: a first expansion unit configured to expand, for at least one layer of the multi-layer neural network model to be trained, the number of input feature maps of the layer; a computing unit configured to perform data computation of the layer by using the expanded input feature maps; a gradient value determining unit configured to determine gradient values of input feature maps before expansion by using gradient values of the expanded input feature maps; a training unit configured to train the network model by using the gradient values of the input feature maps before expansion.

According to another aspect of the present disclosure, it is provided an application apparatus of a multi-layer perception network model, which comprises: an input unit configured to input data corresponding to task requirements to the multi-layer perception network model; an expansion unit configured to expand, for at least one layer in the network model, the number of input nodes of the layer; a computing unit configured to perform data computation of the layer by using the expanded input nodes until the computation in each layer of the network model is completed.

According to another aspect of the present disclosure, it is provided an application apparatus of a multi-layer perception network model, which comprises: an input unit configured to input data corresponding to task requirements to the multi-layer perception network model; a computing unit configured to compute the data in each layer of the network model, wherein following processing is executed on connection coefficients in at least one layer in the network model: dividing connection coefficients into groups, wherein the connection coefficients that are computed with the same input node during the training of the network model belong to the same group; accumulating connection coefficients in the same group to obtain the accumulated connection coefficients for computation with input nodes.

According to another aspect of the present disclosure, it is provided a training apparatus of a multi-layer perception network model, which comprises: an expansion unit configured to expand, for at least one layer of the multi-layer perception network model to be trained, the number of input nodes of the layer; a computing unit configured to perform computation of the layer by using the expanded input nodes; a gradient value determining unit configured to calculate gradient values of nodes before expansion by using gradient values of the expanded nodes; a training unit configured to train the multi-layer perception network model by using the gradient values of the nodes before expansion.

According to another aspect of the present disclosure, it is provided a non-transitory computer-readable storage medium storing instructions for causing a computer to perform the above application method of the multi-layer neural network model when executed by the computer.

According to another aspect of the present disclosure, it is provided a non-transitory computer-readable storage medium storing instructions for causing a computer to perform the above application method of the multi-layer perception network model when executed by the computer.

According to another aspect of the present disclosure, it is provided a non-transitory computer-readable storage medium storing instructions for causing a computer to perform the above training method of the multi-layer neural network model when executed by the computer.

According to another aspect of the present disclosure, it is provided a non-transitory computer-readable storage medium storing instructions for causing a computer to perform the above training method of the multi-layer perception network model when executed by the computer.

Further features of the present disclosure will become apparent from the following description of exemplary embodiments with reference to the accompanying drawings.

BRIEF DESCRIPTION OF THE DRAWINGS

The accompanying drawings, which are incorporated in and constitute a part of the specification, illustrate embodiments of the present disclosure and, together with the description of the embodiments, serve to explain the principles of the present disclosure.

DESCRIPTION OF THE EMBODIMENTS

Figure 1:
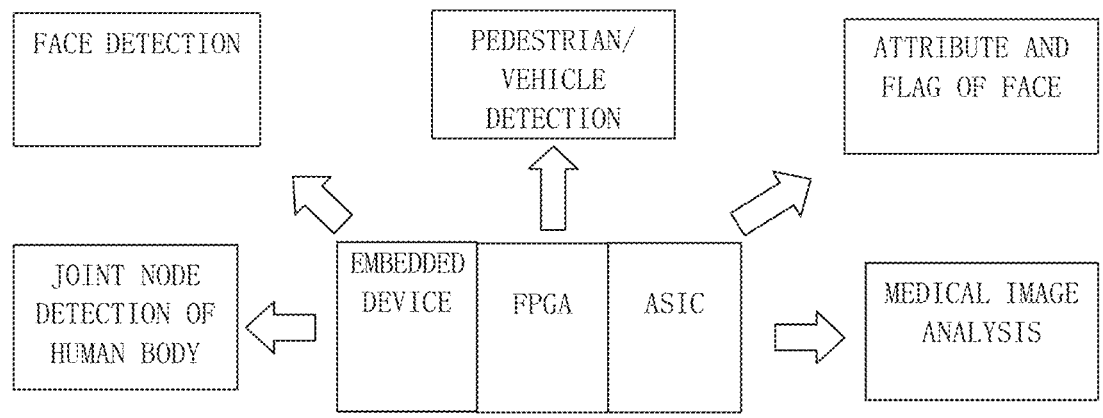
FIG. 1 shows a multi-layer neural network model and a service scene to which it is applied.
Figure 2:
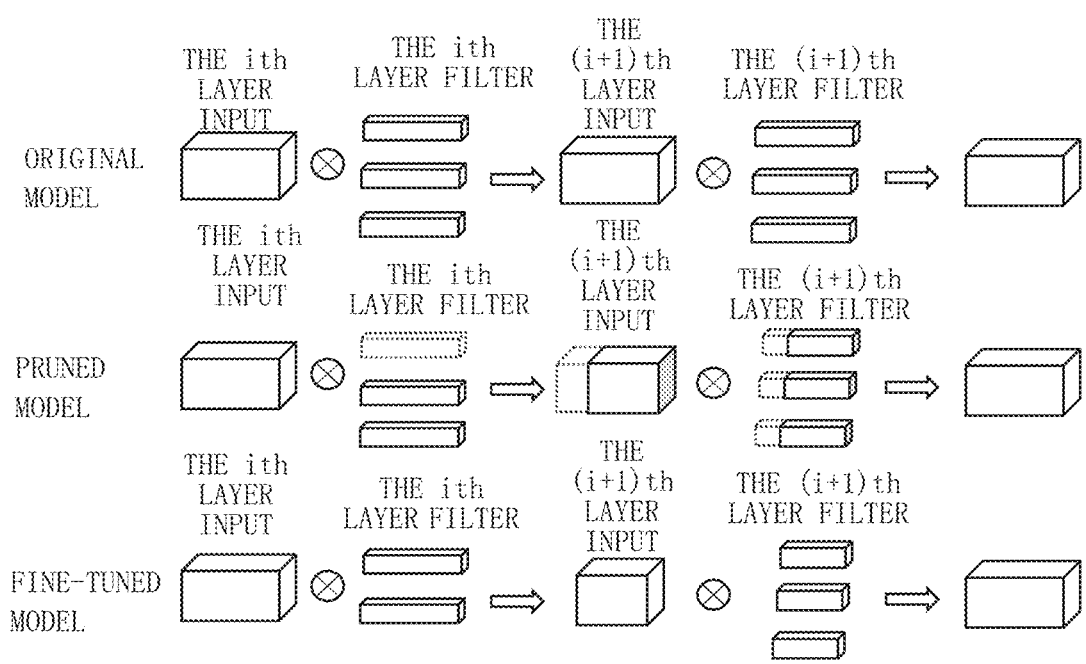
FIG. 2 shows a schematic diagram of Network Pruning.

The structures of the conventional multi-layer neural network models are mostly complicated, and the Network Pruning is one of methods usually used to simply the model structure. FIG. 2 shows processing of an Original Model (a model without subject to a simplification processing), a Pruned Model and a Fine-tuned Model for performing a fine tuning on the Pruned Model during a Forward Propagation.

In the Original Model, it is assumed that there are three filters in the ith layer, the input feature map of the ith layer is performed a convolution computation with the three filters respectively, and then the convolution computation result as the input feature map of the (i+1)th layer (i.e. the output feature map of the ith layer) continues to be performed a convolution computation with filters of the (i+1)th layer, to execute the Forward Propagation. Here, the number of filters of the ith layer is equal to the number of input channels of the (i+1)th layer.

In Pruned Model, a filter that contributes little to the overall performance of the network model in the ith layer (filter shown in dotted line in the ith layer) is firstly removed, and the corresponding channel (filter shown in dotted line in the (i+1)th layer) in the (i+1)th layer of the filter is also removed. In performing the convolution computation, the input feature map of the ith layer is convolved with the remaining two filters of the ith layer, and the convolution computation result of the ith layer is taken as the input feature map of the (i+1)th layer to continue the convolution computation of the (i+1)th layer, so as to perform the forward propagation processing. Fine-tuned Model is the fine-tuning of the Pruned Model to make the performance of the Pruned Model approximately equal to the Original Model.

In the above Network Pruning, the network model can be effectively simplified by removing the unimportant filters. However, on the one hand, the Network Pruning has a limited compression rate in terms of compression, generally ranging from 2-multiple to 3-multiple compression. On the other hand, the difficulty of Network Pruning is to determine which filters in the network model may be removed. For example, according to the contribution degrees to the network model, the filters in the layers are scored respectively, and the filters whose score is lower than a threshold value <T> are regarded as the filters that may be removed. For another example, an entropy score of each filter is calculated by using a fixed compression rate, and the filters whose entropy score is lower than a threshold value <K> are regarded as the filters that may be removed. However, in practical application, it is difficult to determine the threshold value <T> and the threshold value <K>, resulting in that the practical application of Network Pruning is limited.

Figure 3A:
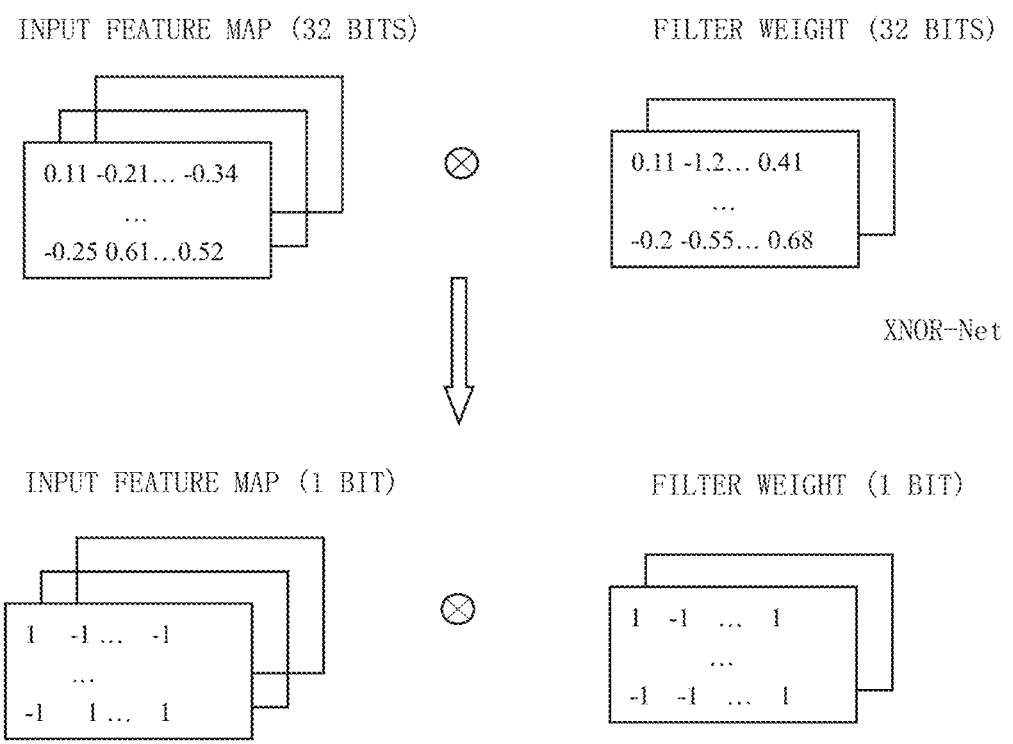
FIG. 3($a$) and FIG. 3($b$) are quantization schematic diagrams of XNOR-Net network model and HWGQ-Net network model, respectively.
Figure 3B:
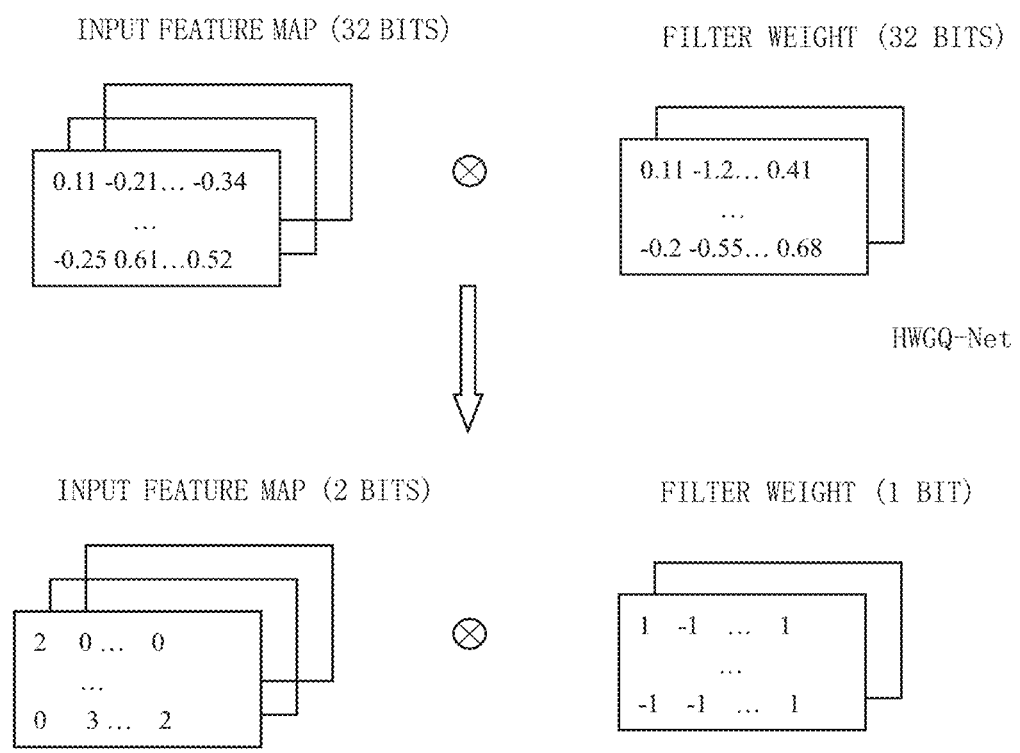

In addition to the model simplification manner of Network Pruning, the XNOR-Net network model with optimized design is also a common simplified model. XNOR-Net network model is a low-bit network model. Except for the first and last layers of the network model, all of the feature maps and weight parameters (i.e., filter weight) of full precision (32 bits) are quantized into low-bit data. As shown in FIG. 3(a), the feature maps are quantized into 1-bit data, and the weight parameters are also quantized into 1-bit data. In addition to the XNOR-Net network model, HWGQ-Net network model is another commonly used optimization model. The HWGQ-Net network model is also a low-bit network model. Compared with the XNOR-Net network model, the feature maps of the HWGQ-Net network model are quantized into 2-bit data, as shown in FIG. 3(b).

The optimized network models such as XNOR-Net and HWGQ-Net have a significant reduction in model size, and the storage resources occupied by storing the feature maps and weight parameters are also significantly reduced. Specifically, theoretically, in the XNOR-Net network model, the quantized weight parameters are reduced to $\frac{1}{32}$ before quantization, and the storage resources are only $\frac{1}{32}$ before quantization. The situation is similar in the HWGQ-Net network model. In addition, since the feature maps and weight parameters are quantized from floating point number into fixed point number, the acceleration of convolution computation can be realized in the network model. Although the network model with optimized design can simplify network model and accelerate the computation, the useful information in the quantized feature maps and the quantized weight parameters will be reduced (that is, the representational information will be reduced), so the precision/performance of the convolution neural network will be significantly reduced.

In the optimization processing for the multi-layer neural network model at present, the optimization network model such as XNOR-Net and HWGQ-Net, is a good selection in the simplification of the network structure and the acceleration of the computation, but these optimization network models have an issue that the network performance is degraded due to quantization. Based on this, the present disclosure provides an optimization technique for the multi-layer neural network model, which includes two aspects of training optimization and application optimization. Specifically, in the training of the network model, the precision of the network model is enhanced with more (rich) weight connections by expanding the number of existing feature maps. In one embodiment, the expanded feature maps need not be additionally stored, and thus the storage amount of the feature maps is not increased. In the application of the network model, the number of existing feature maps is also expanded, and a convolution computation is performed on the feature maps with a large number and the filters after optimized training, so that the application performance of the network model is good. The optimization technique in training and application methods based on the present disclosure can enhance the precision of the network model while the structure of the network model is simplified.

Figure 4:
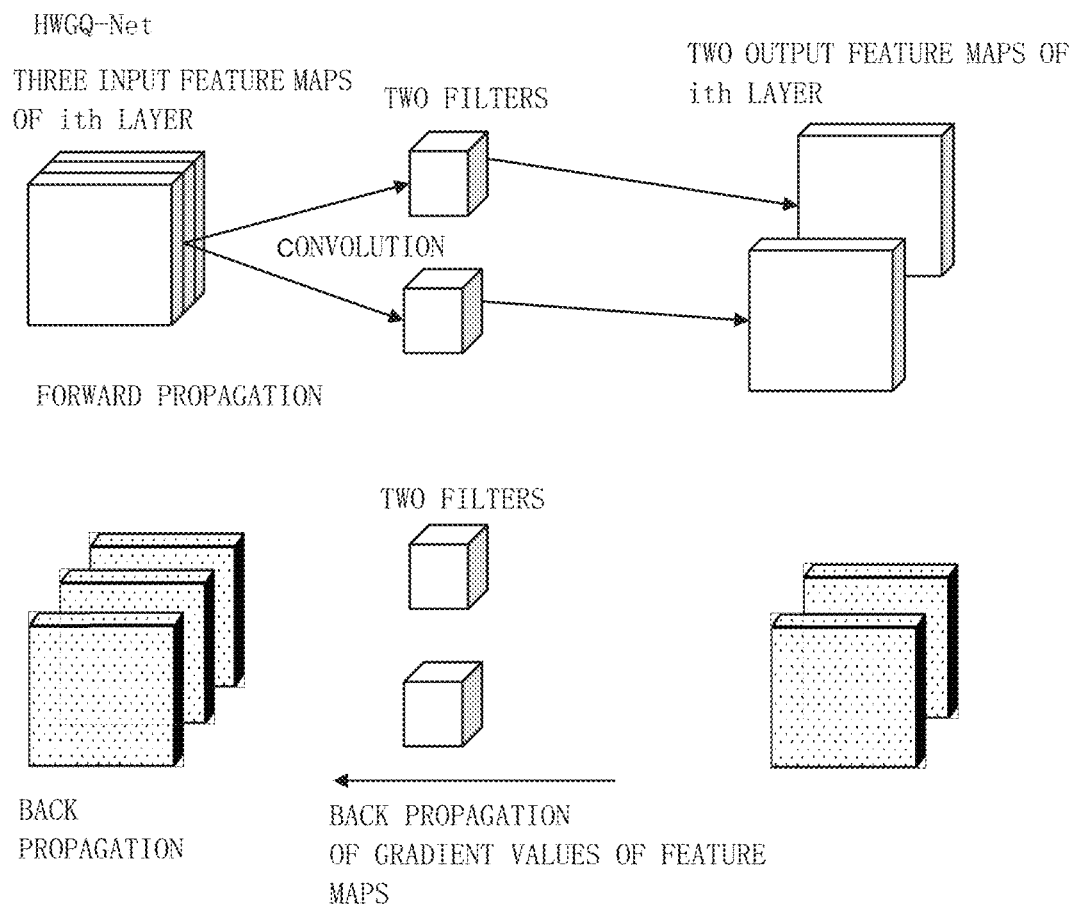
FIG. 4($a$), FIG. 4($b$) and FIG. 4($c$) are Forward Propagation/Back Propagation based on HWGQ-Net and Forward Propagation/Back Propagation based on the present disclosure, respectively.
Figure 4:
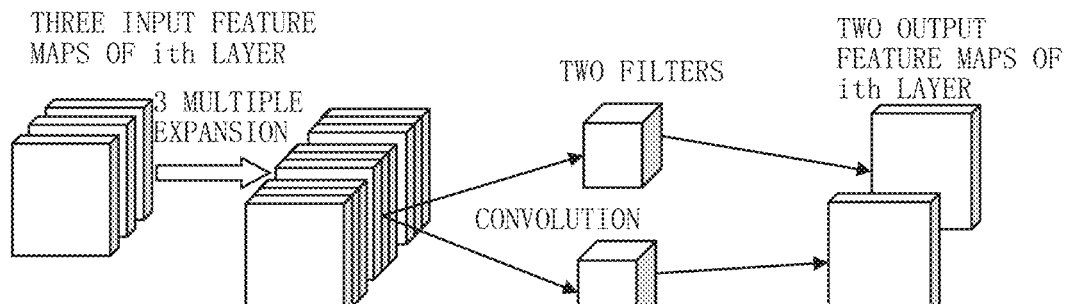
Figure 4:
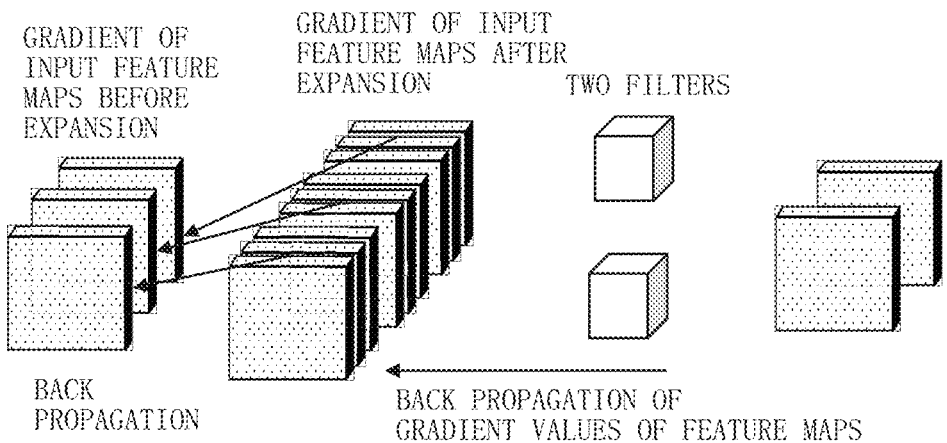
Figure 4:
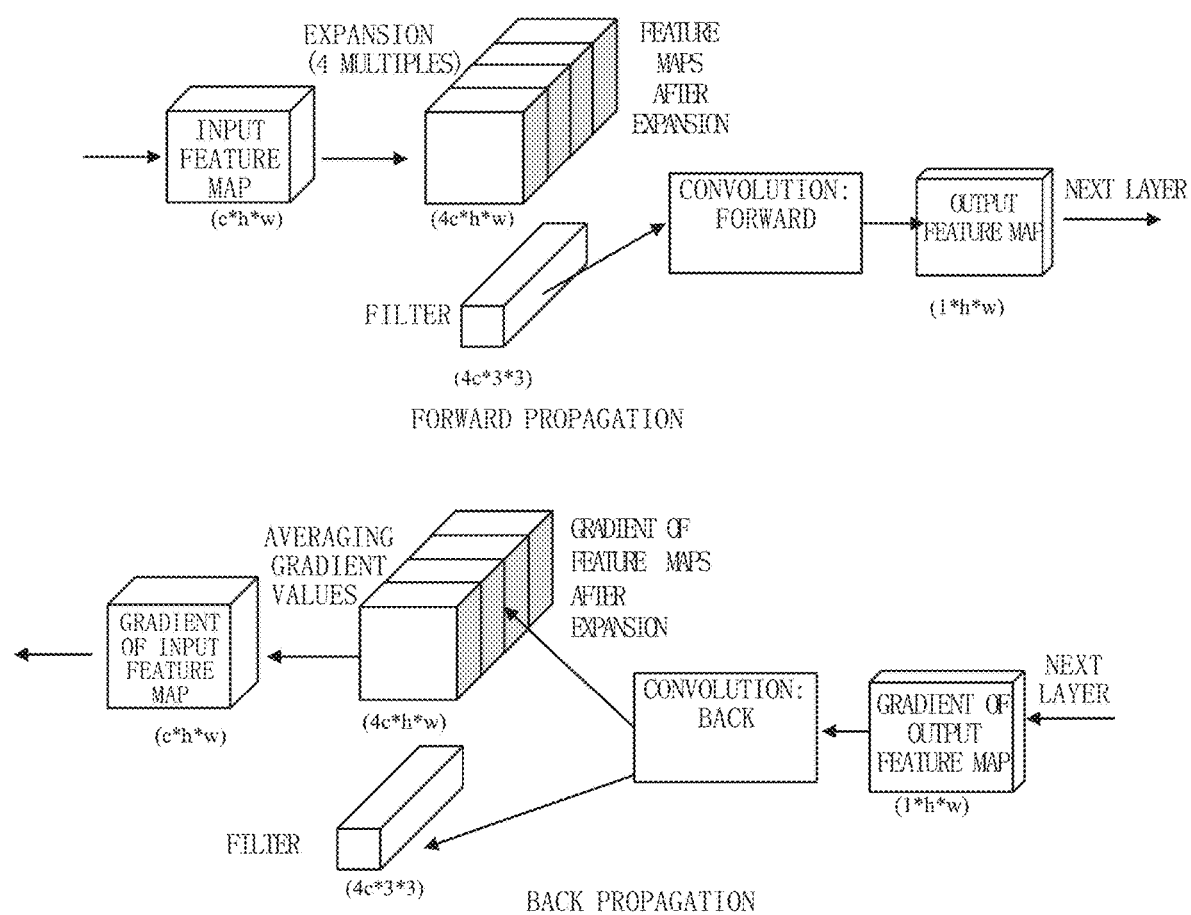

FIG. 4(a) and FIG. 4(b) respectively show a Forward Propagation/Back Propagation process based on HWGQ-Net and a Forward Propagation/Back Propagation process based on the present disclosure. As can be seen from the figures:

(1) In the forward propagation, the ith layer of HWGQ-Net has three input feature maps with 2-bit precision, which are respectively convoluted with two filter weights with 1-bit precision to obtain two output feature maps. In the present disclosure, three feature maps with 2-bit precision are firstly expanded into nine input feature maps with 2-bit precision (3-multiple expansion), and the expanded input feature maps are respectively convoluted with two filter weights with 1-bit precision to obtain two output feature maps. It can be seen from the comparison between the two, in a case where the number of the original input feature maps is small, the method of expanding the number of input feature maps in the present disclosure can generate output feature maps with more distinguishability/representativeness by using more weight information, so as to improve the training and application precision of the network model. It should be noted that FIG. 4(b) is described by taking input feature maps with 2-bit precision as an example for comparison with HWGQ-Net, but the present disclosure is also not limited to input feature maps with other precision, such as 4-bit input feature maps or 8-bit input feature maps.

(2) In the back propagation, the HWGQ-Net network model calculates, layer by layer, the gradient values of the input feature maps from bottom to top, and performs the training of the filter weights of this layer. However, in the present disclosure, for layers in which the feature map expansion has been performed in the forward propagation, gradient values of the input feature maps after expansion are firstly calculated, gradient values of the input feature maps before expansion is calculated according to the gradient values of the input feature maps after expansion, and then filter weights of the previous layer are trained by using the gradient values of the input feature maps before expansion, so as to finally realize the training for the network model. In one embodiment, in the back propagation of the present disclosure, a gradient value of the input feature map as an expansion source can be calculated by averaging gradient values of a plurality of input feature maps which are expanded from the same input feature map, as shown in FIG. 4(c), which will be described in the subsequent embodiment.

The various exemplary embodiments of the present disclosure are described in detail below with reference to the accompanying drawings. It should be understood that the present disclosure is not limited to the various exemplary embodiments described below. In addition, as the solution for solving the issues of the present disclosure, it is unnecessary to include all combinations of features described in the exemplary embodiments.

Figure 5:
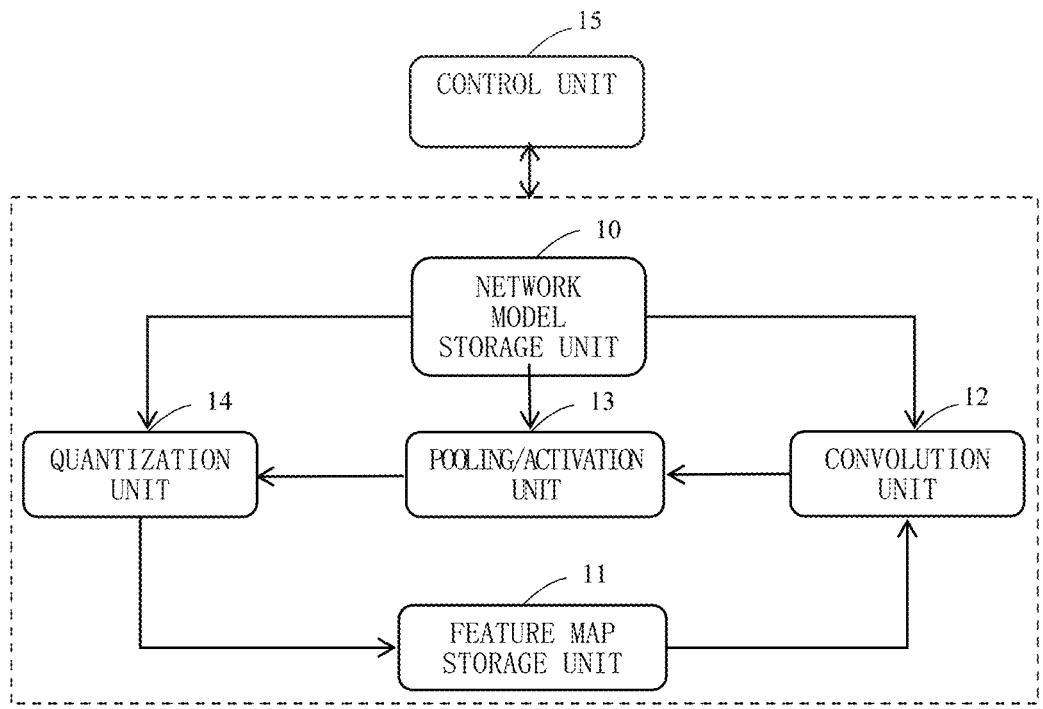
FIG. 5 is a schematic diagram of an internal structure of a network model of the present disclosure.

FIG. 5 shows a schematic diagram of the internal structure of the network model in the present disclosure. During the training and application of the network model, the network model can be run based on the internal structure shown in FIG. 5. The structure includes: a network model storage unit 10, a feature map storage unit 11, a convolution unit 12, a pooling/activation unit 13, a quantization unit 14 and a control unit 15. Each of units is described below, respectively.

The network model storage unit 10 stores information related to the multi-layer neural network model, including but not limited to, network structure information, filter information required for the convolution computation and information required for calculation in other layers; in addition to these, it may also include information related to the number expansion of the input feature maps, for example, input feature maps in what layers will be expanded, the expansion multiple and expansion manner of the input feature maps or the like. The feature map storage unit 11 stores feature map information required in the network model computation. When needed, these feature maps will be expanded in number.

The convolution unit 12 is used to perform a convolution processing according to the filter information input by the network model storage unit 10 and the feature map information input by the feature map storage unit 11. Certainly, if it is required to expand the number of the input feature maps, the convolution unit 12 may also perform expansion according to expansion-related information stored in the network model storage unit 10.

Herein, the pooling/activation unit 13 and the quantization unit 14 are units for performing corresponding pooled/activated processing and quantized processing, and their functions will not be repeatedly described. It should be Noted that FIG. 5 is described by taking the pooling layer and quantization layer included in the multi-layer neural network model as example, and the present disclosure is not limited to other cases, for example, in a case where only a convolutional layer and a quantization layer are included in the multi-layer neural network model, the output result of the convolution unit 12 can reach directly to the quantization unit 14. In addition, the structure shown in FIG. 5 illustrates the pooling/activation unit 13 and the quantization unit 14, and other units which might be included, such as a unit capable of performing a regularization processing and a unit capable of performing a scaling processing are omitted, for which it is not repeatedly described here.

The control unit 15 controls the operations of the network model storage unit 10 to the quantization unit 14 by outputting control signals to other units in FIG. 5.

Figure 6:
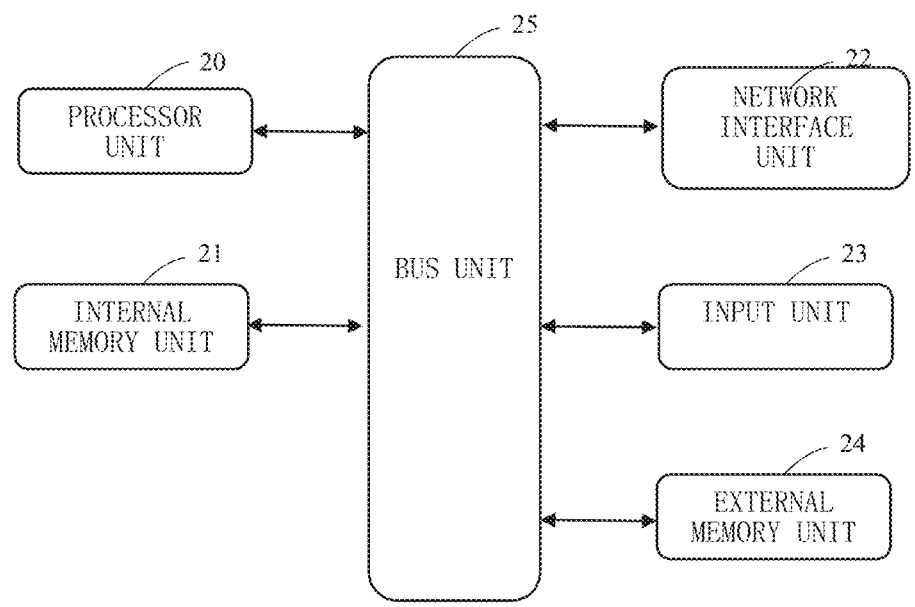
FIG. 6 is a schematic diagram of hardware for running a network model of the present disclosure.

FIG. 6 shows the hardware environment on which the multi-layer neural network model runs, wherein a processor unit 20, an internal memory unit 21, a network interface unit 22, an input unit 23, an external memory 24 and a bus unit 25 are included in the hardware environment.

The processor unit 20 may be a CPU or a GPU. The internal memory unit 21 includes a random access memory (RAM) and a read-only memory (ROM). The RAM may be used as a main memory and work area of the processor unit 20. The ROM may be used to store the control program of the processor unit 20. In addition, the ROM may also be used to store files or other data to be used when the control program runs. The network interface unit 22 can be connected to the network and implement a network communication. The input unit 23 controls input from devices such as a keyboard, a mouse and so on. The external memory 24 stores startup programs and various applications. The bus unit 25 is used to connect each unit in an optimization apparatus of the multi-layer neural network model.

Hereinafter, each embodiment of the present disclosure will be described in detail with reference to the accompanying drawings.

First Exemplary Embodiment

Figure 7:
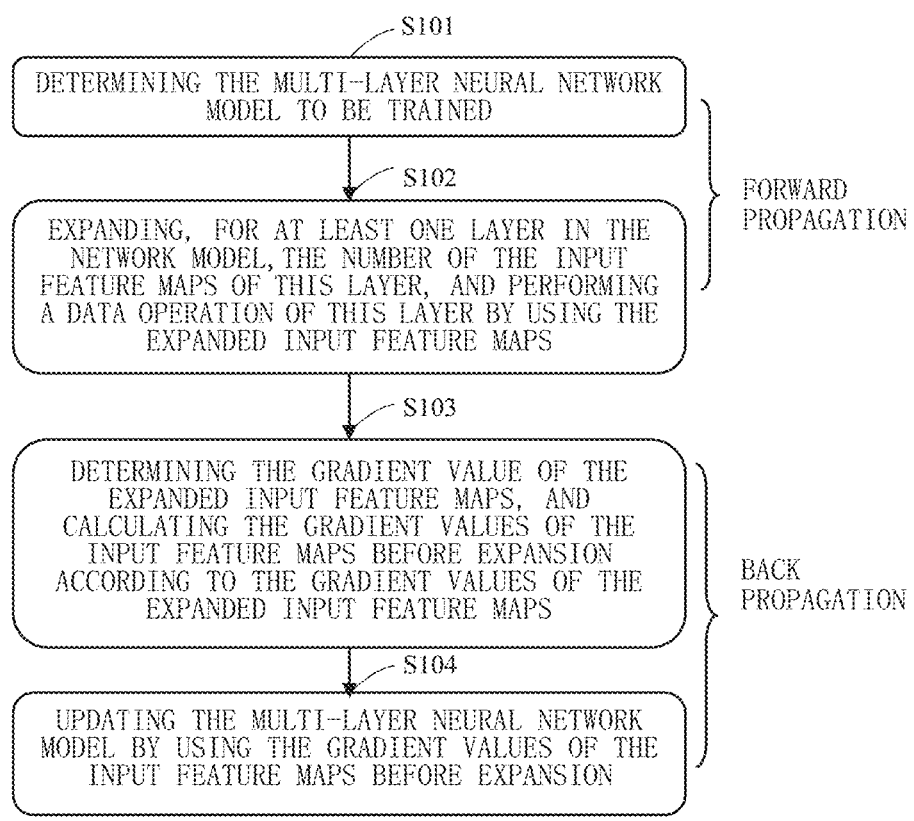
FIG. 7 is a flow schematic diagram of steps of a training method of a multi-layer neural network model of the first exemplary embodiment of the present disclosure.

FIG. 7 describes a flow schematic diagram of steps of a training method for a multi-layer neural network model of the first exemplary embodiment of the present disclosure. In the embodiment 1, the processing flow of the multi-layer neural network model shown in FIG. 7 is implemented by using the RAM as a working memory and causing the CPU 20 execute programs stored in the ROM and/or the external memory 24 (such as forward/back propagation algorithm of the neural network, etc.).

The training process in the embodiment 1 shown in FIG. 7 includes two parts of a forward propagation (steps S101 and S102 described below) and a back propagation (steps S103 and S104 described below), which are respectively described below.

Step S101: determining the multi-layer neural network model to be trained.

In the present embodiment, information of at least one network model can be stored in the network model storage unit 10 shown in FIG. 5, and the feature map information used when the network model is run (including training and application) can be stored in the feature map storage unit 11. When the training is triggered (for example, when a training request is received or training trigger time arrives, etc.), the step S101 starts to be executed. Taking a reception of the training request as an example, according to data and its calibration carried in the received training request (for example, face training pictures and their calibration carried in a face detection request), a multi-layer neural network model for executing the face detection is called as a network model to be trained, and the face training pictures are input to the network model to start training for this network model.

Step S102: for at least one layer in the multi-layer neural network model to be trained, expanding the number of the input feature maps of this layer, and performing a data computation of this layer by using the expanded input feature maps.

Here, the expansion of the number of input feature maps refers to the multiple reproduction of the input feature maps. In other words, when one input feature map is expanded into a plurality of input feature maps, the expanded plurality of input feature maps are identical to the input feature maps before expansion.

When the forward propagation is performed from top to bottom in multi-layer neural network model to be trained, the expansion for the number of the input feature maps may be performed in a part of layers of the network model, or the expansion for the number of input feature maps may be also performed in all layers of the network model, and the present disclosure does not define the layers where the number of the input feature maps is expanded. Certainly, considering that it is beneficial to enhance the computation precision by increasing the number of the input feature maps, the number of the input feature maps may be expanded in the convolutional layer to enhance the precision of the convolution computation. For the convenience of description, the expansion in the convolutional layer will be illustrated as an example in the subsequent description.

In this step S102, the expansion multiple of the input feature maps can be determined according to the number of input feature maps required for actual training, or the expansion multiple of the input feature maps can be determined according to the number of filter channels to be trained. The present disclosure does not define the setting of expansion multiple. Users can preset information such as in which layers the number of input feature maps will be expanded, and expansion multiple, expansion manners and so on.

Alternatively, the number of the input feature maps can be expanded in the preceding layers of the multi-layer neural network model, but not be expanded in the subsequent layers. The benefits of doing it are as follows: on the one hand, in each layer from top to bottom of the network model, the more preceding the positions are, the less the number of input feature maps will be. For example, the number of input feature maps in three convolutional layers at most preceding positions is far less than that in three convolutional layers at most subsequent positions. Therefore, when the number of input feature maps of the layers at preceding positions is expanded, the number of input feature maps after expansion will not be too much, and the size of the network model will not be excessively increased. On the other hand, since the number of input feature maps in the layers at preceding positions is small, the useful information of input feature maps will be further reduced after quantization. Therefore, the number of input feature maps in the layers at preceding positions is expanded to generate output feature maps with more distinguishability/representativeness by using more weight information. Here, "preceding positions" are a relative expression. For a network model with a low network depth, the preceding positions may refer to the first three layers, while for a network model with a high network depth, the preceding positions may refer to the first six layers. The present application does not specifically define the "preceding positions", but it is generally understood that, the preceding positions are for example the first 10% layers of the network model.

Table 1 shows an example of a multi-layer neural network model. For the convenience of description, only the convolutional layer 1-convolutional layer 12 in the multi-layer neural network model is shown, and other layers are omitted. It is assumed that the number of input feature maps of convolutional layer 1 is 3, and the number of input feature maps of convolutional layer 2~convolutional layer 12 is $c_1$~$c_{11}$ respectively (that is, the number of output feature maps of the previous layer). The fifth column of table 1 shows the weight size of each layer and the overall network model of HWGQ-Net (the number of input feature maps is not expanded). The sixth column shows the weight size of each layer and the overall network model in the network model of the present disclosure. The design of the network model of the present disclosure is as follows: the number of input feature maps in convolutional layer 1 is expanded by 8 multiples, the number of input feature maps in convolutional layer 2 is expanded by 4 multiples, the number of input feature maps in convolutional layer 3 is expanded by 2 multiples, and the number of input feature maps in other convolutional layers is not expanded.

It can be known from the table 1 that in the network model of the present disclosure, output feature maps of the convolutional layer 1~convolutional layer 3 are obtained by convoluting the expanded input feature maps with more number (more diverse) of filters, therefore, the information contained in output feature maps in the convolutional layer 1~convolutional layer 3 has better distinguishability than output feature maps in HWGQ-Net; And, since the number of the original input feature maps in the convolutional layer 1~convolutional layer 3 is less, the corresponding original filters are also small. Therefore, even if the number is expanded by 8 multiples, 4 multiples and 2 multiples, the size of the network model is also increased by only a small proportion in overall, that is, the difference between the weight size $m_1+m_2+m_3$ of the first three layers and $8*m_1+4*m_2+2*m_3$ is not large from seen in the whole network model, the increasing amount of the size of the network model is very small.

TABLE 1

| | Number of input feature maps | Number of the expanded input feature maps | Number of output feature maps | HWGQ-Net Weight size when the number of input feature maps is not expanded | Present disclosure Weight size when the number of input feature maps of the first three layers |
|---|---|---|---|---|---|
| Convolutional layer 1 | 3 | 8*3 (8x) | $c_1$ | $m_1 = c_1*3*3*3$ | $8*m_1 = c_1*(8*3)*3*3$ |
| Convolutional layer 2 | $c_1$ | $4*c_1$ (4x) | $c_2$ | $m_2 = c_2*c_1*3*3$ | $4*m_2 = c_2*(4*c_1)*3*3$ |
| Convolutional layer 3 | $c_2$ | $2*c_2$ (2x) | $c_3$ | $m_3 = c_3*c_2*3*3$ | $2*m_3 = c_3*2*c_2)*3*3$ |
| Convolutional layer 4 | $c_3$ | $c_3$ | $c_4$ | $m_4 = c_4*c_3*3*3$ | $m_4$ |
| Convolutional layer 5 | $c_4$ | $c_4$ | $c_5$ | $m_5 = c_5*c_4*3*3$ | $m_5$ |
| Convolutional layer 6 | $c_5$ | $c_5$ | $c_6$ | $m_6 = c_6*c_5*3*3$ | $m_6$ |
| Convolutional layer 7 | $c_6$ | $c_6$ | $c_7$ | $m_7 = c_7*c_6*3*3$ | $m_7$ |
| Convolutional layer 8 | $c_7$ | $c_7$ | $c_8$ | $m_8 = c_8*c_7*3*3$ | $m_8$ |
| Convolutional layer 9 | $c_8$ | $c_8$ | $c_9$ | $m_9 = c_9*c_8*3*3$ | $m_9$ |
| Convolutional layer 10 | $c_9$ | $c_9$ | $c_{10}$ | $m_{10} = c_{10}*c_9*3*3$ | $m_{10}$ |
| Convolutional layer 11 | $c_{10}$ | $c_{10}$ | $c_{11}$ | $m_{11} = c_{11}*c_{10}*3*3$ | $m_{11}$ |
| Convolutional layer 12 | $c_{11}$ | $c_{11}$ | $c_{12}$ | $m_{12} = c_{12}*c_{11}*3*3$ | $m_{12}$ |
| Model size (bit) | | | | $m_1 + m_2 + m_3 +$ sum$(m_4, \ldots, m_{12})$ | $8*m_1 + 4*m_2 + 2*m_3 +$ sum$(m_4, \ldots, m_{12})$ |

In the step S102, the number of input feature maps can be expanded in a variety of manners, which will be illustrated in the following description and not be repeatedly described here.

In the multi-layer neural network model, computations are performed layer by layer from top to bottom until the last layer outputs the results of forward propagation. For example, for face detection applications, the position of the face to be detected can be determined as the result of forward propagation according to the input face picture and its calibration. After the end of forward propagation, the back propagation is executed after the results of forward propagation are compared with the calibration and Loss is calculated, so as to realize the training of multi-layer neural network model. The back propagation process of the present embodiment 1 will be described below.

Step S103: determining gradient values of the expanded input feature maps, and calculating gradient values of the input feature maps before expansion according to the gradient values of the expanded input feature maps.

Here, the input feature map has the same meaning in back propagation and forward propagation. For example, the input feature map at the ith layer in the forward propagation process is the input feature map at ith layer in the back propagation process.

In the back propagation, the gradient value of each element of the input feature map in the layer is calculated layer by layer from bottom to top from the last layer. The manner of calculating the gradient values involved in each embodiment of the present disclosure may be any calculation manner known in the industry, which is not limited in the present disclosure.

When calculating the gradient value of each element in the input feature map, if the current layer does not expand the number of input feature maps in the forward propagation, it is not necessary to perform the recovery processing of the number of the input feature maps in this step S103.

After calculating the gradient values of the input feature maps in a known manner, it can directly proceed to step S104. If the current layer expands the number of input feature maps in step S102, the processing of the step S103 is be performed after the gradient value of each element in the expanded input feature maps is calculated according to the known technique. Specifically, for an input feature map before expansion, a plurality of input feature maps after expansion are completely identical to the input feature maps before expansion. In the forward propagation, the expanded input feature maps are respectively convoluted with the corresponding filter channels. In the corresponding back propagation, when the gradient values of the expanded input feature maps are calculated in the known manner, the gradient values of the same expanded input feature maps are different. Therefore, the gradient values of the expanded input feature maps is used to calculate the gradient values of the input feature maps before expansion. The specific implementation manner of calculating the gradient values of the input feature maps before expansion will be described later, which is not repeatedly described here.

Step S104: updating the multi-layer neural network model by using the gradient values of the input feature maps before expansion.

If the number of input feature maps is not expanded in the ith layer in the forward propagation, the gradient of each channel of filters in the (i−1)th layer according to the gradient values of input feature maps in the ith layer (gradient values of output feature maps in the (i−1)th layer) and each channel of filters is updated in this step. If the ith layer expands the number of input feature maps in the forward propagation, the gradient value of each channel of filters in the (i−1)th layer is determined according to the gradient values of input feature maps before expansion in the ith layer (gradient values of output feature maps in the (i−1)th layer) and each channel of filters is updated in this step. The specific updating manner may be known updating manner, which is not limited in the present disclosure.

According to the training method of the first exemplary embodiment of the present disclosure, in a case where the number of the input feature maps is less, the distinguishability of the output feature maps of convolution computation can be enhanced by using the expanded input feature maps and more filter channels in the convolution computation based on the expansion of the number of input feature maps, in other words, performance of the network model is enhanced while the network model is simplified. In one embodiment, a temporary storage area may be allocated for the expanded input feature maps, and after the end of back propagation, the temporary storage area allocated for the expanded input feature maps can be released, thus saving storage space.

Still taking the comparison with the HWGQ-Net network model as an example, table 2 shows the structure description of the HWGQ-Net network model and the structure description of the network model of the present disclosure. It is assumed that: in the HWGQ-Net network model, the input feature maps are quantized into 2-bit precision, the weight of filter channels is quantized into 1-bit precision, and the number of input feature maps is not expanded; in the network model of the present disclosure, the input feature maps are quantized into 2-bit precision, and the weight of the filter channels is quantized into 1-bit precision, meanwhile, as shown in table 1, the number of input feature maps in convolutional layer 1-convolutional layer 3 is expanded by 8 multiples, 4 multiples and 2 multiples, respectively. When the two network models shown in table 2 are applied to face detection service, the obtained comparison results of performance and model size are as shown in table 3. Generally speaking, the upper limit of full-precision network model in face detection is 0.93 (face detection rate). As can be seen from table 3, although the quantized network model of the present disclosure is worse than the network model with full accuracy, it has better performance compared with HWGQ-Net with the same quantization degree, and the model size is only slightly larger than that of HWGQ-Net.

TABLE 2

| Network Model | Structure Description |
| --- | --- |
| HWGQ-Net | the input feature maps are quantized into 2-bit precision, the weight of filter channels is quantized into 1-bit precision, and the number of input feature maps is not expanded |
| Present Disclosure | the input feature maps are quantized into 2-bit precision, the weight of the filter channels is quantized into 1-bit precision, the number of input feature maps in convolutional layer 1~ convolutional layer 3 is respectively expanded by 8 multiples, 4 multiples and 2 multiples, and the number of input feature maps in other layers is not expanded |

TABLE 3

|  | HWGQ-Net | Present Disclosure |
| --- | --- | --- |
| Face Detection | 0.86 | 0.892 (3.2% ↑) |
| Model Size (Sum of all layers) | 152.81 KB | 153.86 KB (0.6% ↑) |

Next, each step of the first exemplary embodiment of the present disclosure are described in detail.

<Expanding Number of Input Feature Maps>

In the present disclosure, there are many manners to expand the number of input feature maps. The following illustrates several manners to expand the number of input feature maps. It should be noted that the present disclosure is not limited to the following manners of extending the number of input feature maps and their combination, as long as the manners capable of reproducing input feature maps to achieve the number expansion can be applied in the solution of the present disclosure.

1. Replication

Expanding the number of input feature maps in a replication manner refers to that the input feature maps to be expanded are replicated several times to obtain a plurality of identical input feature maps of which number satisfies the requirements after being replicated. The replication described here is to replicate the input feature map to be replicated as a whole, and the replicated input feature maps have the same element value at the same position. For example, assuming that there are 32×16 elements in input feature map 1, the replicated input feature map 1' and the input feature map 1 have the same element value for each element in the same position.

Figure 8:
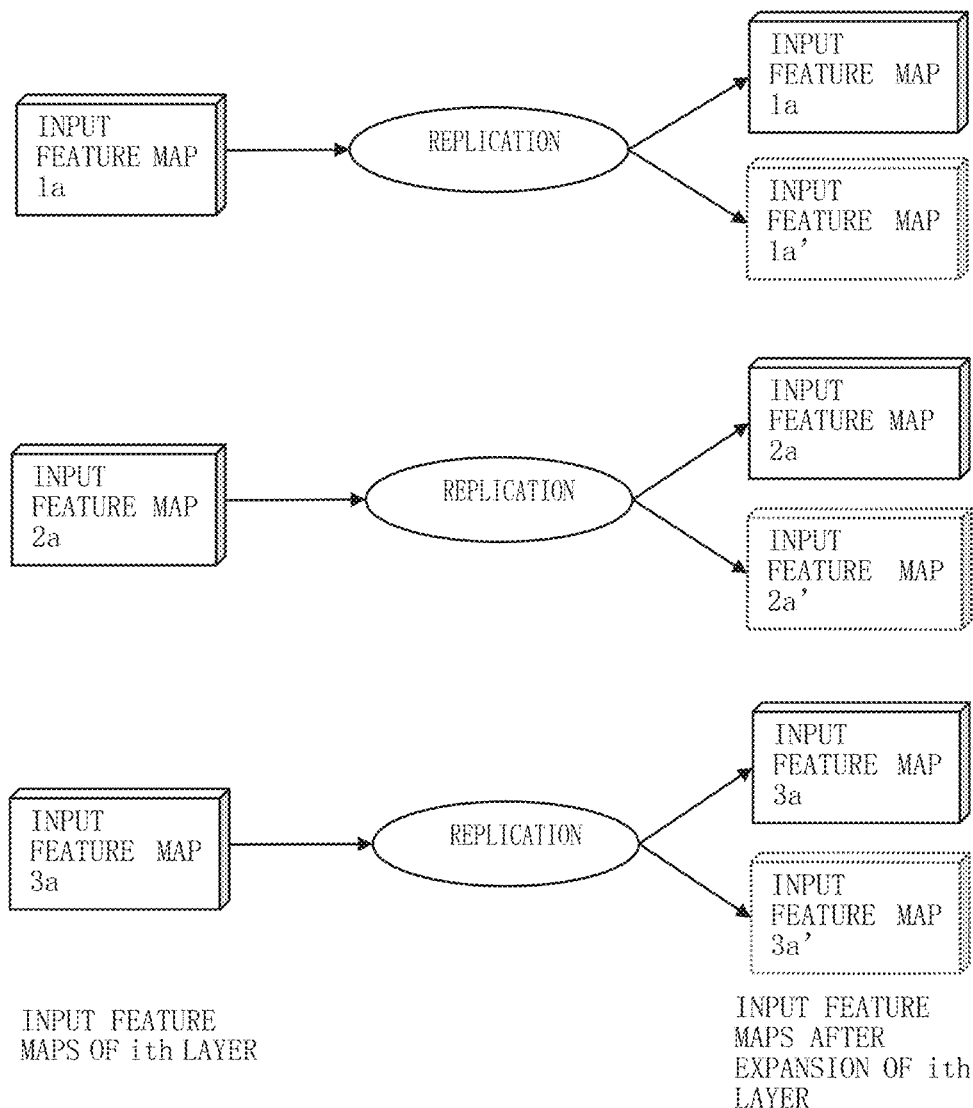
FIG. 8 is a schematic diagram of expanding the number of input feature maps in a replication manner.

FIG. 8 is a schematic diagram of the replication of the input feature maps. It is assumed that the input feature maps 1a, 2a and 3a are respectively replicated once (2-multiple expansion) to obtain six expanded input feature maps. Where, the input feature map 1a and the input feature map 1a' (shown in dotted line) are the same input feature maps; the input feature map 2a and input feature map 2a' are the same input feature map; and the input feature map 3a and the input feature map 3a' are the same input feature maps.

There are several manners for achieving the replication. For example, the input feature maps before replication are cached in a buffer area, then the input feature maps are replicated to obtain the replicated input feature maps, and the replicated input feature maps are also cached in the buffer area by a indexing technique such that the replicated input feature maps can be read quickly when the convolution computation is performed.

2. Convolution

Figure 9:
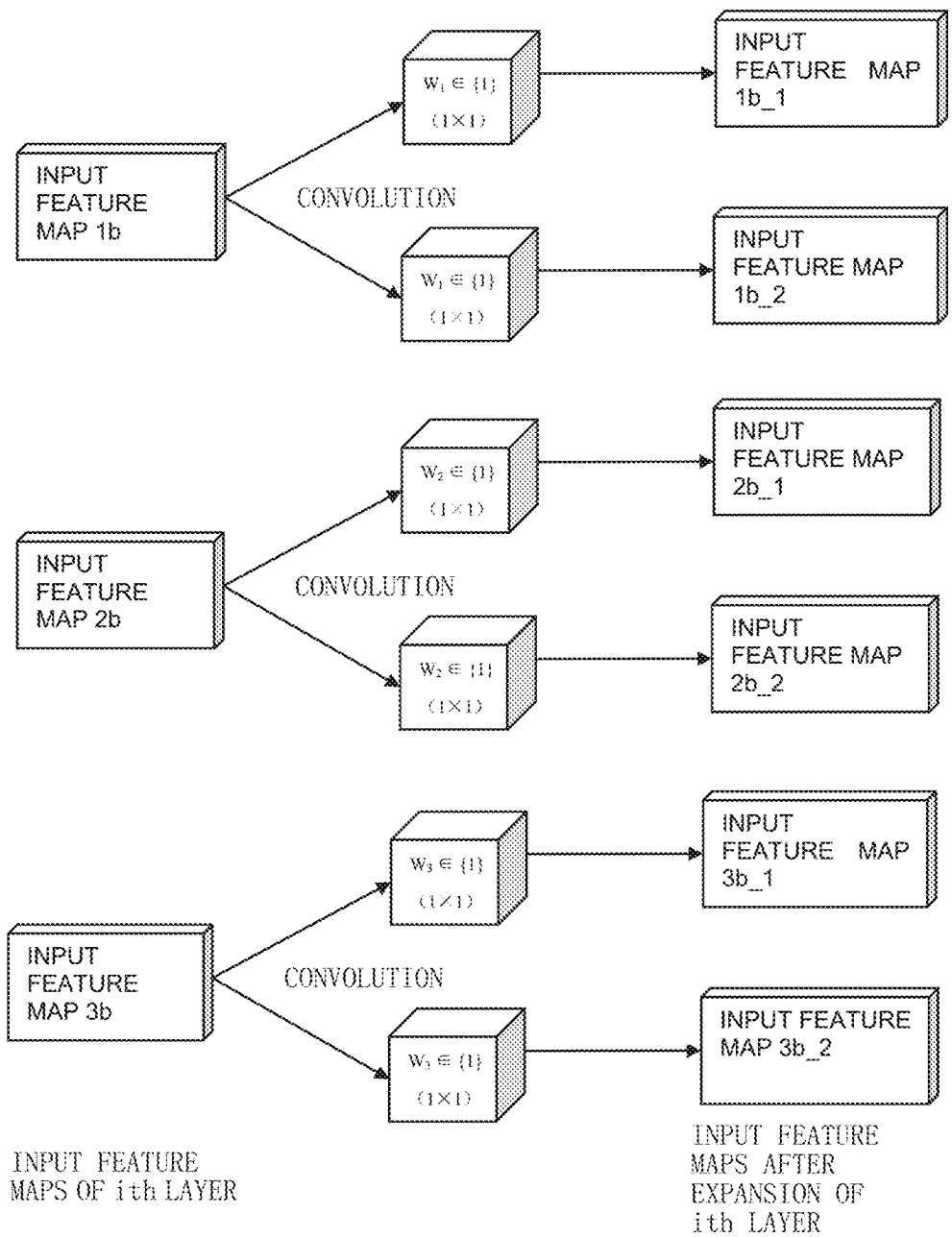
FIG. 9 is a schematic diagram of expanding the number of input feature maps in a convolution manner.

Expanding the number of input feature maps by a convolution manner refers to: setting a plurality of identical filters for at least one input feature map to be expanded, convoluting the input feature map to be expanded with the plurality of identical filters set thereof to obtain the input feature maps of which number is expanded. Alternatively, it is assumed that a certain input feature map will be performed 2-multiple expansion, the two identical filters W (1×1) can be set for this input feature map, wherein W∈{1}, such that not only the convoluted input feature maps can made identical, but also the convoluted input feature maps (i.e., the expanded input feature maps) are identical to the input feature maps before the convolution. See the example shown in FIG. 9, it is assumed that input feature maps 1b, 2b and 3b will be expanded by 2 multiple, two identical filters $W_1 \in \{1\}$ (1×1) are set for the input feature map 1b in advance, two identical filters $W_2 \in \{1\}$ (1×1) are set for the input feature map 2b, and two identical filters $W_3 \in \{1\}$ (1×1) are set for the input feature map 3b. The input feature map 1b is convoluted with two identical filters W1 respectively, to obtain the expanded input feature map 1b_1 and input feature map 1b_2, wherein the input feature map 1b_1 and the input feature map 1b_2 are identical. The same is done for the input feature map 2b and the input feature map 3b. It is noted that the filters set for the input feature maps to be expanded ∈{1} (1×1), but the present embodiment is not limited to other weight value ranges and filters with other sizes.

3. Expansion of Previous Layer

For the layer where the input feature maps will be expanded, the expansion of the input feature maps of this layer can be regarded as the expansion of the output feature map of the previous layer thereof. Herein, the previous layer may be the previous convolutional layer, or a regularization layer or a nonlinear transformation layer (such as Relu, pooling, etc.) between the layer and the previous convolutional layer. Examples of both cases are given below, respectively.

3-1. Expansion of the Previous Convolutional Layer

Filters are set in a previous convolutional layer of a layer where the number of the input feature maps will be expanded, wherein the number of the set filters is equal to the number of input feature maps after expansion, at least two filters among the set filters are the same filters, and feature maps generated in the previous convolutional layer by using the set filters are output.

Figure 10:
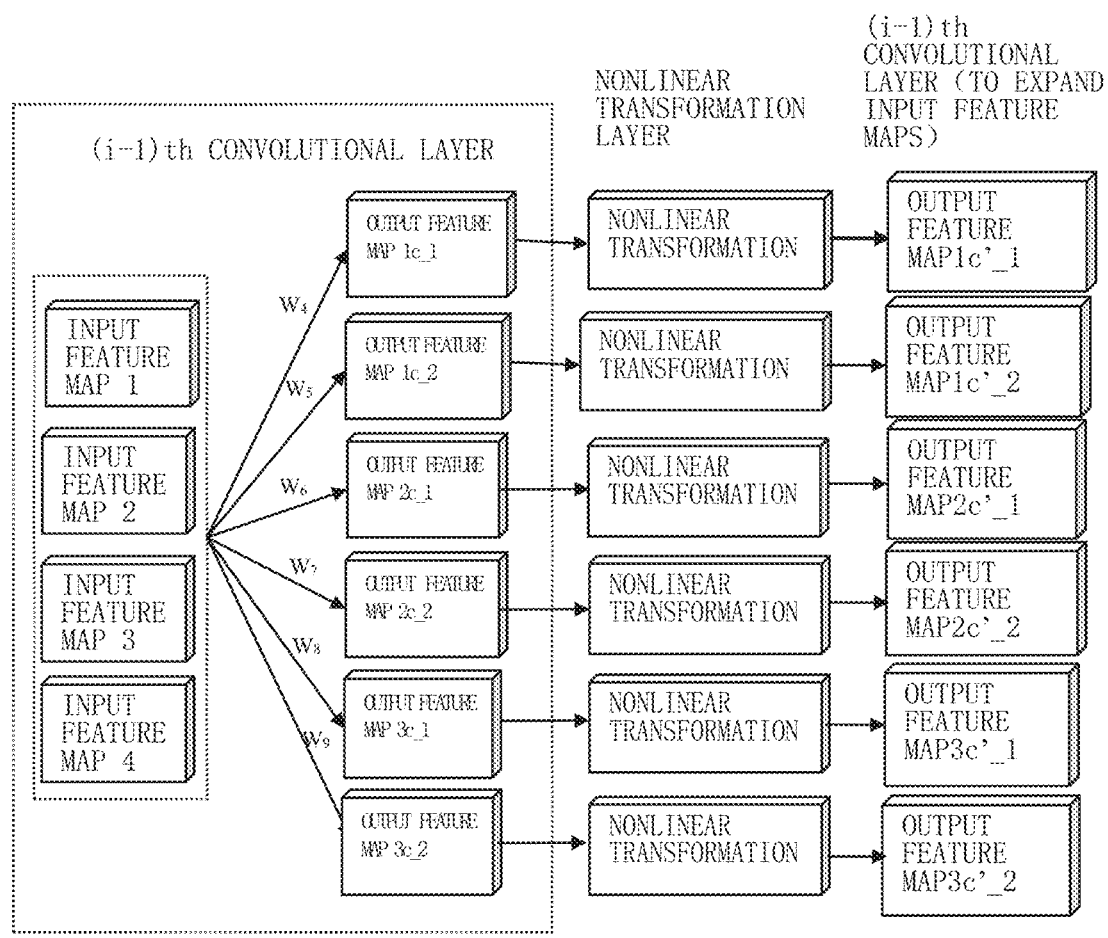
FIG. 10 is a schematic diagram of expanding the number of input feature maps in a previous layer.

Taking the case shown in FIG. 10 as an example, it is assumed that the ith convolutional layer is the layer where the input feature maps will be expanded, and the number of the input feature maps after expansion is expected to be six, wherein two input feature maps in a group among these six input feature maps are the same input feature maps. For this reason, six filters are set in the previous convolutional layer (the (i-1)th convolutional layer) of the ith convolutional layer, and the six filters are as follows: two identical filters $W_4=W_5$, two identical filters $W_6=W_7$ and two identical filters $W_8=W_9$. Six output feature maps are obtained by performing a convolution computation on the four input feature maps in the (i-1)th convolutional layer and the set six filters, wherein the output feature map 1c_1 and the output feature map 1c_2 are identical output feature map, the output feature map 2c_1 and the output feature map 2c_2 are identical output feature map and the output feature map 3c_1 and the output feature map 3c_2 are identical output feature map. If there is no other layers between the (i-1)th convolutional layer and the ith convolutional layer, the six output feature maps of the (i-1)th convolutional layer may be taken as the six input feature maps after the expansion of the ith convolutional layer. If there is a regularization layer or a nonlinear transformation layer, etc. between the (i-1)th convolutional layer and the ith convolutional layer (as shown in FIG. 10), the six output feature maps of the (i-1)th convolutional layer after being subject to a nonlinear transformation will be transferred to the ith convolutional layer.

3-2. Expansion in a Layer Therebetween the Previous Convolutional Layer

When there is a regularization layer or a nonlinear transformation layer between a layer of which the number of input feature maps will be expanded and the previous convolutional layer of the layer, the computation and output of this layer are performed after the input feature maps of the regularization layer or the nonlinear transformation layer are replicated, or the feature maps after the computation of this layer is performed are replicated and output.

It is still assumed that the number of expanded input feature maps required by the ith convolutional layer is six, wherein two input feature maps in a group among these six input feature maps are identical input feature map. If there is a nonlinear transformation layer between the ith convolutional layer and the (i-1)th convolutional layer, when the (i-1)th convolutional layer transfers three input feature maps to the nonlinear transformation layer, one approach is to firstly replicate these three input feature maps once in the nonlinear transformation layer respectively to obtain six expanded feature maps, and then transfer these six expanded feature maps, after being subject to the processing in the nonlinear transformation layer, to the ith convolutional layer. Another approach is that in this nonlinear transformation layer, the processing in this layer is firstly performed on these three input feature maps transferred by the (i-1)th convolutional layer, these three feature maps processed in this layer are replicated once respectively to obtain six expanded feature maps, and then the six expanded feature maps are transferred to the ith convolutional layer.

The above is described by taking the existence of one nonlinear transformation layer as an example. Of course, there may be a regularization layer or more nonlinear transformation layers between the ith layer and the previous convolutional layer thereof, but the processing manner is similar to the above mentioned, and it will be extendedly described here.

Hardware Implementation

The above three expansion manners are all realized by means of software, and this embodiment 1 is also not limited to expanding the number of the input feature maps by hardware manner. For example, through the hardware design, the input feature maps are directly read many times to obtain the input feature maps of which number is expanded without caching the expanded input feature maps.

Figure 11:
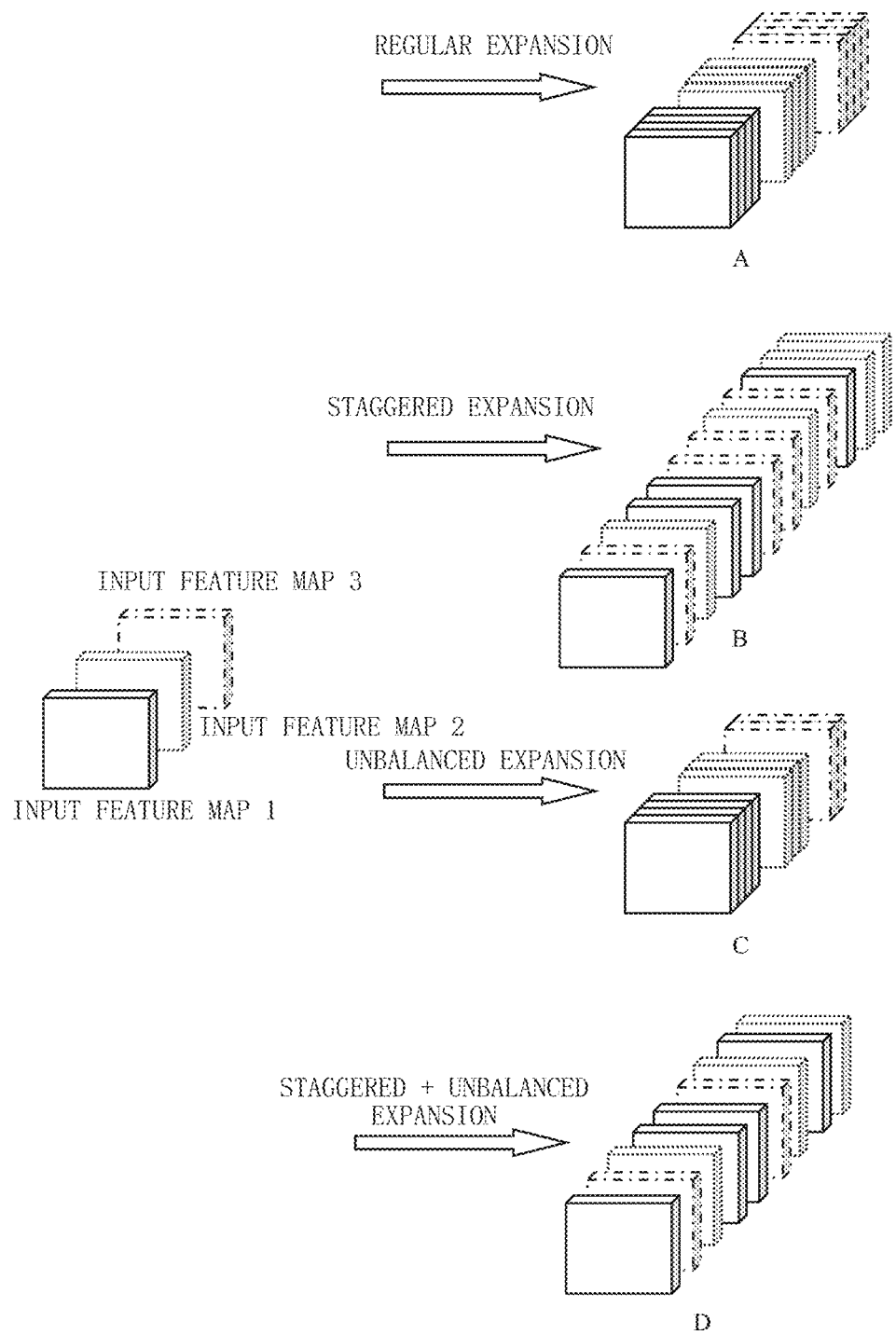
FIG. 11 is an example diagram of four expansion manners.

The above four manners of expanding the number of input feature maps are illustrated by taking a case where the input feature maps are sequentially expanded by the same multiple as an example, but the solution of this embodiment 1 is not limited to this. FIG. 11 shows four cases where the number of input feature maps can be expanded in different orders and multiples, and all of the above four manners of expanding the number of input feature maps can be executed as shown in FIG. 11. See FIG. 11, it is assumed that the input feature maps to be expanded is input feature map 1 (solid line), input feature map 2 (dotted line) and input feature map 3 (dash doted line). The four kinds of expansion cases of the three input feature maps are described as follows:

The first case is a regular expansion, that is, the three input feature maps are sequentially expanded by the same multiple. See figure A on the right of FIG. 11, the input feature map 1~input feature map 3 are sequentially expanded by 4 multiples. It is assumed that the shape of the input feature map 1 is <c, h, w>, wherein c is the number of the input feature map 1, which is 1 before expansion, and h and w are the height and width of the input feature map 1. After expansion, the shape of the input feature map 1 is <4c, h, w>. It is the same for the cases of the input feature map 2 and the input feature map 3.

The second case is a staggered expansion, that is, the expansion multiples of the three input feature maps are the same, but the expansion orders are different. See figure B on the right of FIG. 11, the input feature map 1~input feature map 3 are expanded by 4 multiples, but the input feature map 1~input feature map 3 are expanded staggerly.

The third case is unbalanced expansion, that is, the three input feature maps are sequentially expanded but the expansion multiples are not completely the same. See figure C on the right of FIG. 11, the input feature map 1 is expanded by 4 multiples, the input feature map 2 is expanded by 3 multiples, and the input feature map 3 is expanded by 2 multiples.

The fourth case is staggered expansion+unbalanced expansion, that is, the three input feature maps are staggerly expanded and the expansion multiples are not completely the same. See figure D on the right of FIG. 11.

<Gradient Value Setting in Back Propagation>

Since the number of input feature maps is expanded in the step S102, the gradient values of the input feature maps is calculated before expansion in the back propagation of the embodiment 1. One optional implementation manner is that, for a plurality of identical input feature maps after expansion, the gradient values of the plurality of identical input feature maps after expansion of the current layer are determined firstly according to the output feature maps transferred from the next layer, and then the gradient values of the elements at the same position of these identical input feature maps are taken an average value, as the gradient value of the element at this position of the input feature map before expansion.

Figure 12:
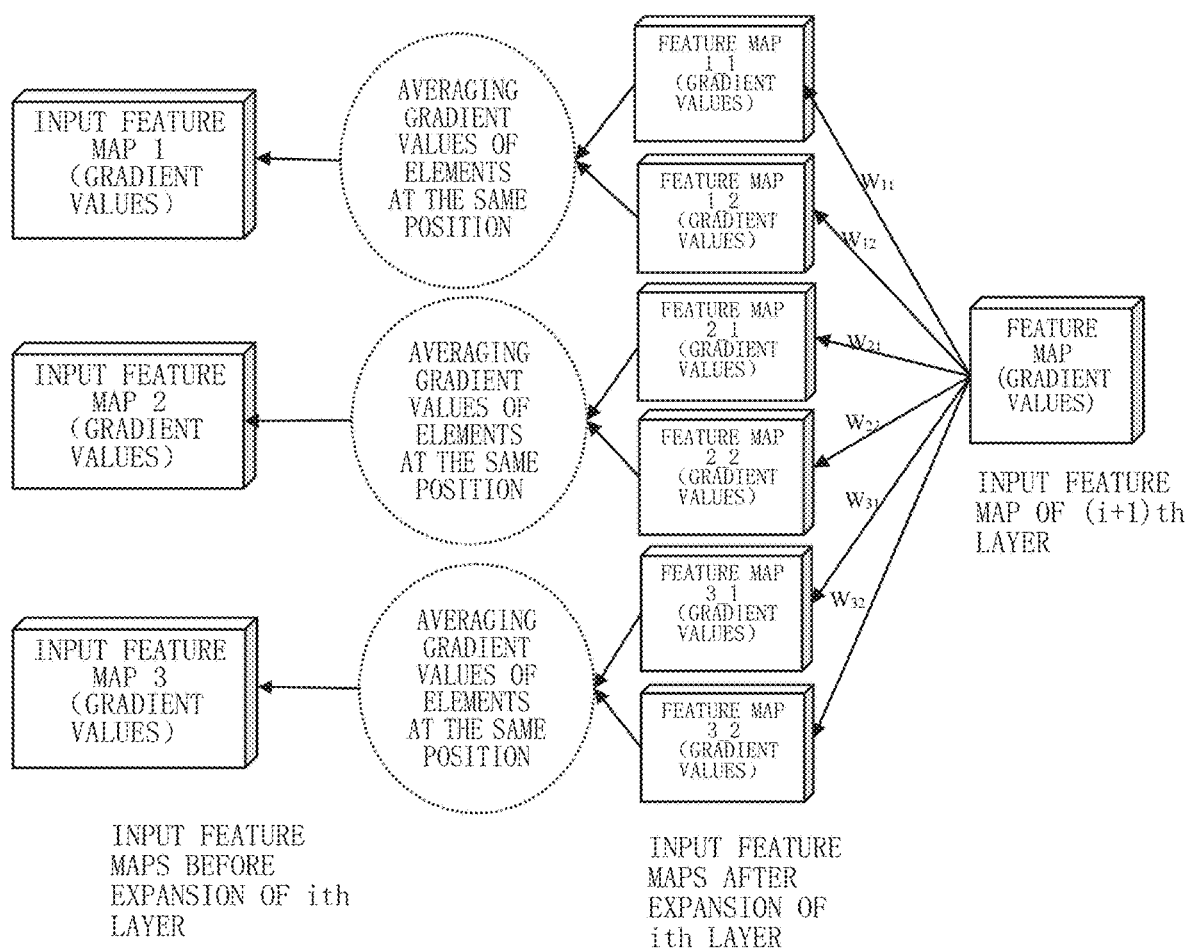
FIG. 12 is a schematic diagram of Back Propagation.

FIG. 12 shows the back propagation process at the ith layer. It is assumed that the back propagation process of the (i+1)th layer has been finished, the gradient value of each of the input feature maps 1_1 to 3_2 after expansion of the ith layer is calculated by computing the gradient values of the input feature maps of the (i+1)th layer (output feature map of the ith layer) with the channels $W_{11}$ to $W_{32}$ of the filters in the ith layer, wherein the input feature map 1_1 and the input feature map 1_2 are feature maps obtained by expanding the input feature map 1, the input feature map 2_1 and the input feature map 2_2 are feature maps obtained by expanding the input feature map 2, and the input feature map 3_1 and the input feature map 3_2 are feature maps obtained by expanding the input feature map 3.

The gradient values of elements at the same position of the identical input feature maps after expansion are averaged and the gradient average value is taken as a gradient value at this position of the input feature map before expansion. For example, the input feature map 1_1 and the input feature map 1_2 each has 32×16 elements, average value of the gradient values of elements at position (0,0) of the two input feature maps are firstly calculated, and then the average value of the gradient values is taken as element at position (0,0) of the input feature map 1, to calculate gradient values of all elements of the input feature map 1 by that analogy. For the input feature map 2 and the input feature map 3, the case is the same, and it is not extendedly described.

Second Exemplary Embodiment

Figure 13:
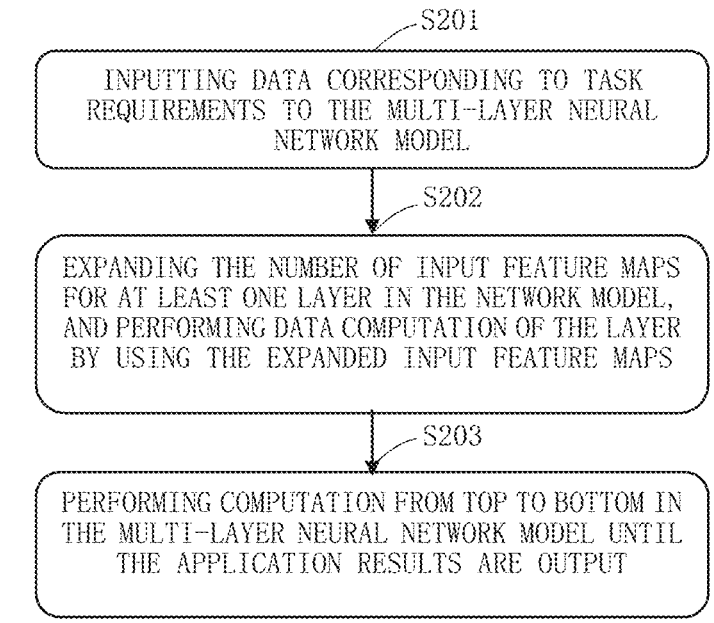
FIG. 13 is a flow schematic diagram of steps of an application method of the second exemplary embodiment of the present disclosure.

After implementing the training of the network model based on the first exemplary embodiment, the embodiment 2 describes a method for applying the trained network model. The application method of this embodiment 2 is a method for performing a computation by expanding the number of input feature maps. FIG. 13 describes a flow schematic diagram of steps of a method in the embodiment 2. In this exemplary embodiment 2, the processing flow of the multi-layer neural network model shown in FIG. 13 is implemented by using the RAM as a working memory and causing the CPU 20 execute programs stored in the ROM and/or the external memory 24 (such as application algorithm, etc.).

Step S201: inputting data corresponding to task requirements to the multi-layer neural network model.

In this step S201, the application services may be performed by using the multi-layer neural network model trained based on the training method of the first exemplary embodiment. Taking the face detection service as an example, the face image and its description data are input into the multi-layer neural network model as data for face detection service, so that it is desired to perform face recognition service in the network model.

Step S202: expanding the number of input feature maps for at least one layer in the network model, and performing data computation by using the expanded input feature maps.

The expansion of the input feature maps in the step S202 is the same as the expansion in the step S102 in the embodiment 1, including determination in which layers the expansion will be performed, expansion multiple and expansion manners, etc., which are not extendedly described here.

Figure 14:
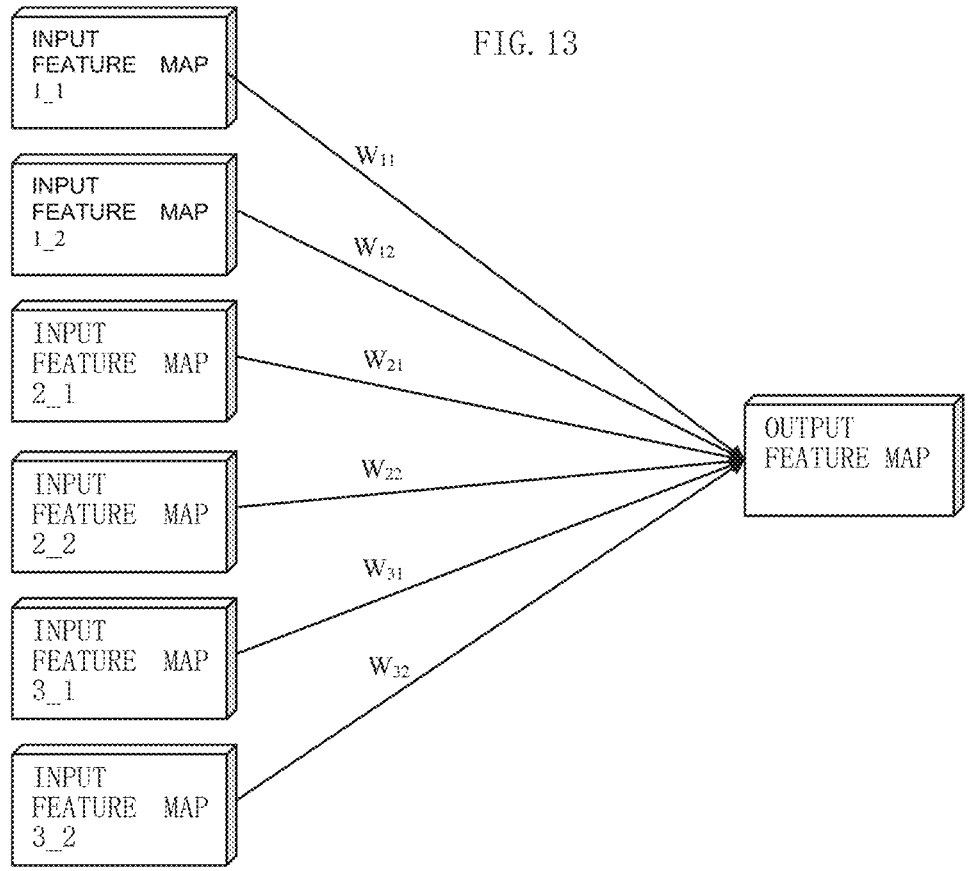
FIG. 14 is a schematic diagram of a convolution process of the second exemplary embodiment of the present disclosure.

Taking the case shown in FIG. 14 as an example, it is assumed that in the training process of the embodiment 1, after the three input feature maps are sequentially expanded by 2 multiples, the six channels $W_{11}$, $W_{12}$, $W_{21}$, $W_{22}$, $W_{31}$ and $W_{32}$ of the filters in this layer are trained. In the application process of this embodiment 2, after three input feature maps (input feature maps 1-3) are also sequentially expanded by 2 multiples (input feature maps 1_1-3_2), and they are respectively convoluted and summed with $W_{11}$~$W_{32}$ to obtain an output feature map of this layer.

Step S203: performing computation from top to bottom in the multi-layer neural network model until the application results are output.

In the solution of this embodiment 2, by expanding the number of input feature maps, a convolution sum is performed on the filters trained in a manner of expanding the number of feature maps in embodiment 1. Please note that the method in this embodiment 2 can be applied to the network model trained based on the embodiment 1. Therefore, the computing process described in this embodiment 2 but not described in the embodiment 1 may also be applied to the training in the embodiment 1. Similarly, the computing process described in the forward propagation in the embodiment 1 but not described in the embodiment 2 may also be applied in the application of this embodiment 2.

Third Exemplary Embodiment

Figure 15:
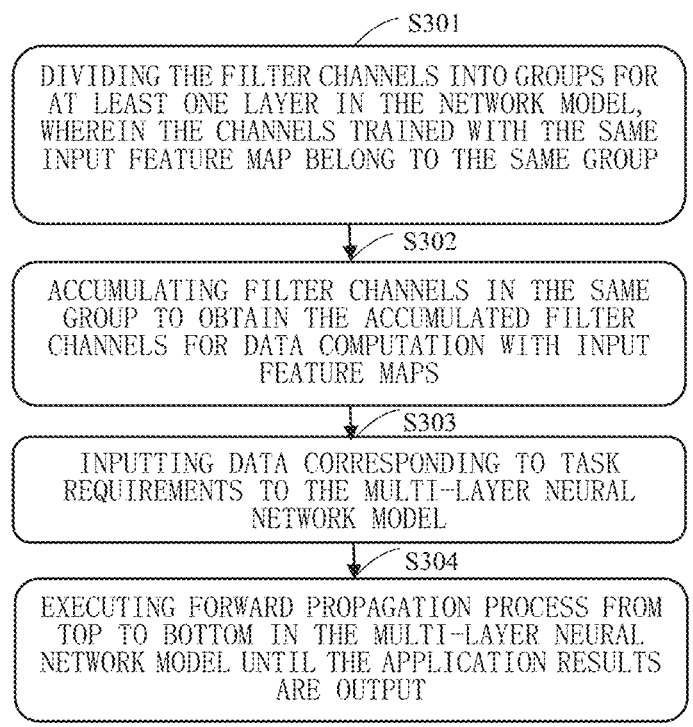
FIG. 15 a flow schematic diagram of steps of an application method of the third exemplary embodiment of the present disclosure.

After the training of the network model is completed based on the first exemplary embodiment, the embodiment 3 describes another method of applying the trained network model, and the application method is not to expand the number of input feature maps, but accumulate the channels of the filters after training, and perform the convolution computation by using the accumulated new channels. FIG. 15 describes a flow schematic diagram of method steps of the third exemplary embodiment of the present disclosure.

Before performing the application method of the embodiment 3, the following filter channel accumulation processing may be performed on the trained network model, and then the application method of the embodiment 3 is performed by using the accumulated new channels when necessary.

Step S301: for at least one layer in the network model, dividing the filter channels of this layer into groups, wherein the channels that are performed computation with the same input feature map in the training process of the network model belong to the same group.

Since the number of channels of filters to be trained is set according to the number of the expanded input feature maps in the training process of the embodiment 1, if the number of input feature maps will not be expanded in the application process of the embodiment 3, the number of filter channels is reduced such that the reduced number of the filter channels matches with the number of the input feature maps which are not expanded.

It is assumed that in the training process of the embodiment 1, after the three input feature maps are sequentially expanded by 2 multiples, the six channels $W_{11}$, $W_{12}$, $W_{21}$, $W_{22}$, $W_{31}$ and $W_{32}$ of a certain filter in this layer are trained, wherein $W_{11}$ and $W_{12}$, $W_{21}$ and $W_{22}$, $W_{31}$ and $W_{32}$ are respectively convoluted with the same expanded input feature map. In the application of this embodiment 3, see FIG. 16, channels $W_{11}$ and $W_{12}$ are divided into the same group; Similarly, $W_{21}$ and $W_{22}$ are divided into the same group, and $W_{31}$ and $W_{32}$ are divided into the same group.

Step S302: accumulating the filter channels in the same group to obtain the accumulated filter channels for data computation with the input feature maps.

Figure 16:
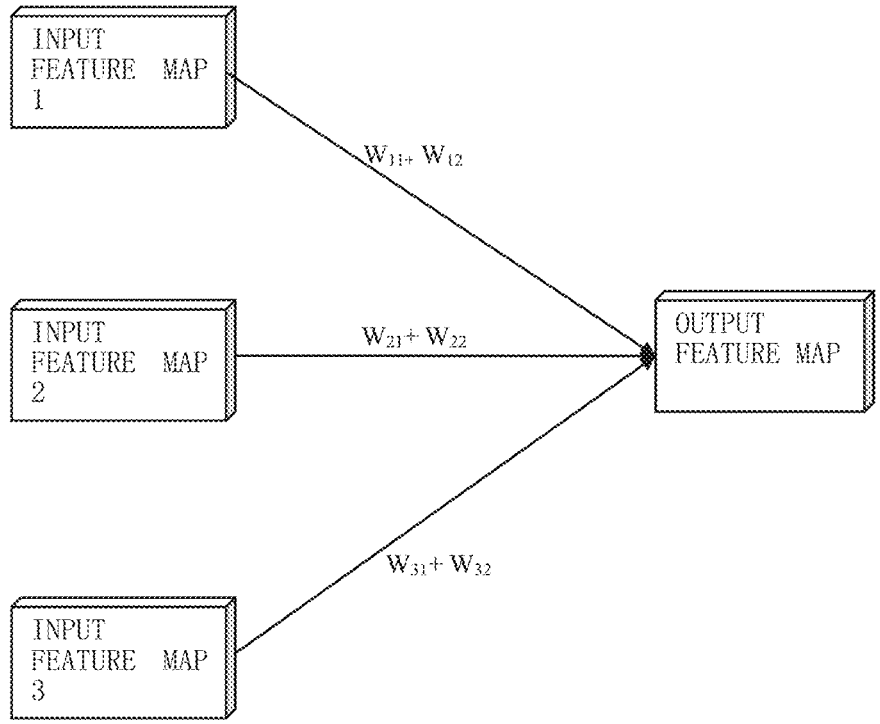
FIG. 16 a schematic diagram of a convolution process of the third exemplary embodiment of the present disclosure.

Still taking the case shown in FIG. 16 as an example, the weights at the same position in channels $W_{11}$ and $W_{12}$ are summed, namely, the channels are accumulated, to obtain a new channel $W_{11\text{-}12}=W_{11}+W_{12}$, including the effective parameters in channels $W_{11}$ and $W_{12}$. Channels $W_{21}$ and $W_{22}$ are accumulated to obtain a new channel $W_{21\text{-}22}=W_{21}+W_{22}$, and channels $W_{31}$ and $W_{32}$ are accumulated to obtain a new channel $W_{31\text{-}32}=W_{31}+W_{32}$. Here, the bit number of weight of the accumulated new channel $W_{11\text{-}12}$ may be greater than the bit number of $W_{11}$ and $W_{12}$. In the application process thereafter, as input feature maps 1 to 3 of the current layer, $W_{11\text{-}12}$ is convoluted with the input feature map 1, $W_{21\text{-}22}$ is convoluted with the input feature map 2, $W_{31\text{-}32}$ is convoluted with the input feature map 3, and an output feature map is generated by summing the convolution results.

It should be noted that the above steps S301 and S302 may be regarded as preprocessing steps in this embodiment 3 to perform filter channel accumulation processing in advance before performing the application service. Alternatively, the present embodiment 3 is also not limited to the execution of the above steps S301 and S302 during the application service, i.e., the above steps S301 and S302 are executed between the steps S303 and S304.

Step S303: inputting data corresponding to task requirements to the multi-layer neural network model.

This step S303 is the same to the process as the step S201 in the embodiment 2.

Step S304: executing the forward propagation process from top to bottom in the multi-layer neural network model until the application results are output.

Please note that the method in the embodiment 3 may be an application of the network model trained based on the embodiment 1. Therefore, the computing process described in this embodiment 3 but not described in the embodiment 1 may also be applied to the training in the embodiment 1. For example, in the forward propagation of the embodiment 1, the filter channels may also be grouped as in the step S302.

Fourth Exemplary Embodiment

Figure 17:
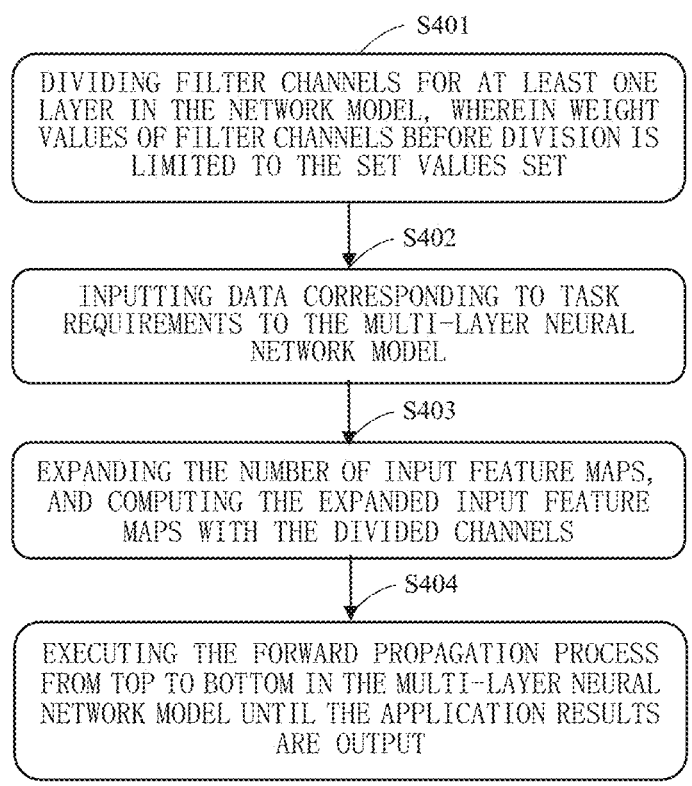
FIG. 17 a flow schematic diagram of steps of an application method of the fourth exemplary embodiment of the present disclosure.

This embodiment 4 describes a method for applying a network model, wherein the network model applied herein may be a network model trained according to the training method in the embodiment 1 or a network model trained based on other training methods. Before performing the application of this embodiment 4, the filter channels are divided to obtain more number of channels, and then the application process is realized by computing with the input feature maps after the number expansion. FIG. 17 describes a flow schematic diagram of the method steps of the fourth exemplary embodiment of the present disclosure.

Step S401: for layers where the number of input feature maps will be expanded in the network model, dividing filter channels into more number of channels.

Here, for a plurality of channels obtained from the division of the same channel, the weight value range of the divided channels may be the same or different. It is assumed that the weight value of the channel before division is [2, 0, −2, −2], the weight value range is {−2, 0, 2}, the weight value of the first channel after division is [1, −1, −1, −1], the weight value range is {−1, 1}, and the weight value of the second channel after division is [1, 1, −1, −1], the weight value range is {4, 1}. At this time, the weight value ranges of the two channels after division are the same. It is also assumed that the weight value of the channel before division is [3, 0, −2, −2], the weight value range is {−2, 0, 3}, the weight value of the first channel after division is [2, −1, −1, −1], the weight value range is {4, 2}, and the weight value of the second channel after division is [1, 1, −1, −1], the weight value range is {−1, 1}. At this time, the weight value ranges of the two channels after division are different.

Figure 18A:
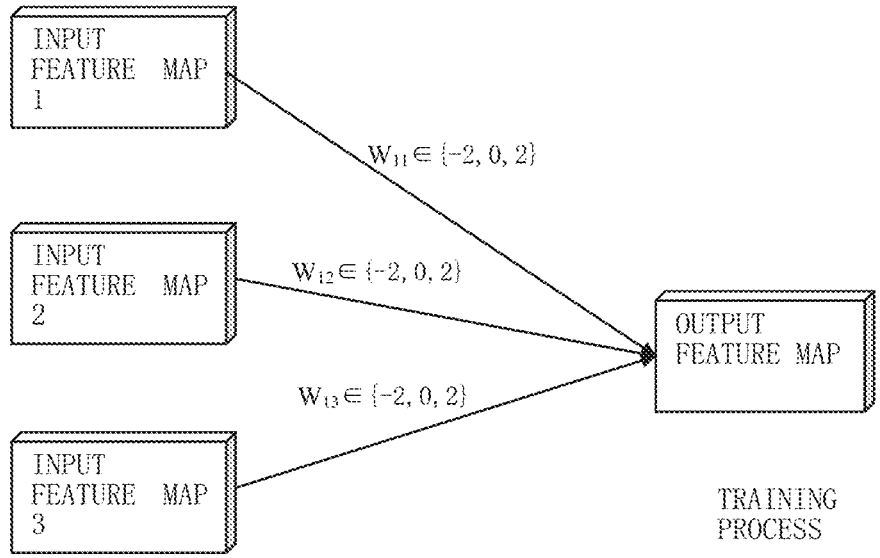
FIG. 18($a$) is a schematic diagram of a convolution at training stage of the fourth exemplary embodiment of the present disclosure.
FIG. 18(b) is a schematic diagram of a convolution at an application stage of the fourth exemplary embodiment of the present disclosure.

See the example shown in FIG. 18(a), the weight value range of channels $W_{11}$, $W_{12}$ and $W_{13}$ of the filter before division is {−2, 0, 2}. Based on this, see the application example shown in FIG. 18(b), the channels $W_{11}$, $W_{12}$ and $W_{13}$ are respectively divided into two channels with the weight value range of {4, 1}: $W_{11\_1}$, $W_{11\_2}$, $W_{12\_1}$, $W_{12\_2}$, $W_{13\_1}$ and $W_{13\_2}$.

It should be noted that the processing of dividing filter channels in the above step S401 may be regarded as the preprocessing step of the embodiment 4. Before performing the application service, the division of filter channels is performed in advance, so as to perform data computation in the subsequent application service by using the divided filter channels. Alternatively, this embodiment 4 is also not limited to performing the filter channel dividing step of the above step S401 during performing the application service, i.e., the above step S401 is performed between step S402 and step S403.

Step S402: inputting data corresponding to task requirements to the multi-layer neural network model.

The network model here may be the model trained in the manner shown in FIG. 18(a). It is assumed that the filter to be trained has three channels $W_{11}$, $W_{12}$ and $W_{13}$, and the input feature map is convoluted with the three channels respectively.

Step S403: expanding the number of input feature maps, and performing computation on the expanded input feature maps and the divided channels.

Figure 18B:
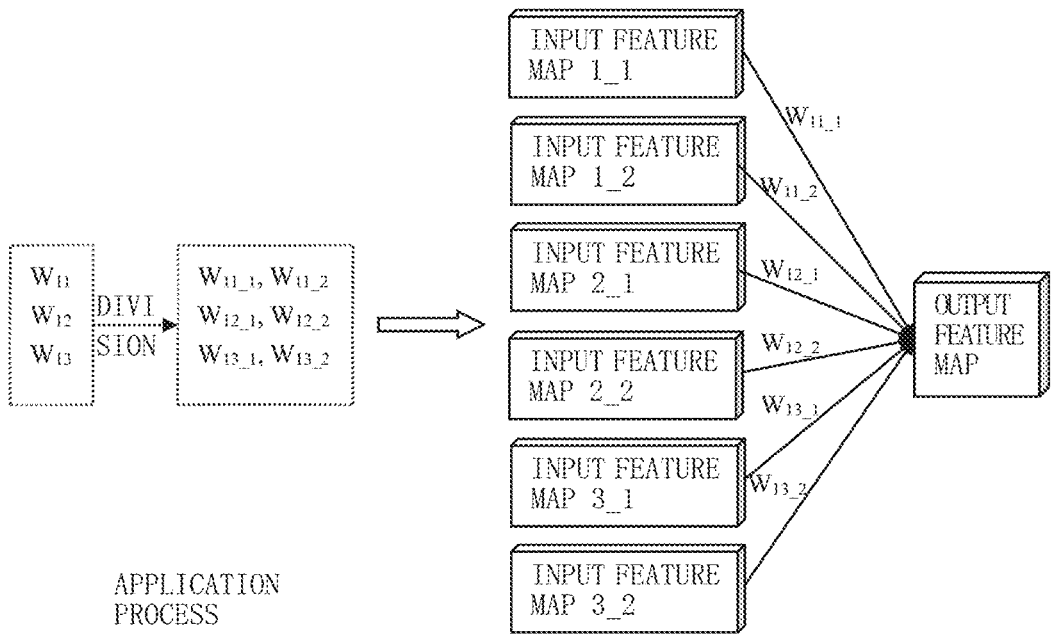

See FIG. 18(b) again, it is assumed that the number of input feature maps is 3, and six input feature maps generated by respectively expanding them by 2 multiples are convoluted with the channels after division to obtain the output feature map. Wherein, the identical input feature maps are respectively convoluted with two channels divided from the same channel, for example, the input feature map 1_1 and the same input feature map 1_2 are respectively convoluted with $W_{11\_1}$ and $W_{11\_2}$.

Step S404: executing the forward propagation process from top to bottom in the multi-layer neural network model until the application results are output.

Please note that the method in this embodiment 4 may be the application of the network model trained based on the embodiment 1. Therefore, the computing process described in this embodiment 4 but not described in the embodiment 1 may also be applied to the training in the embodiment 1. For example, in the forward propagation of the embodiment 1, the filter channels may also be divided as in the step S402, and the expanded input feature maps is convolved with the divided filter channels.

Fifth Exemplary Embodiment

Figure 19:
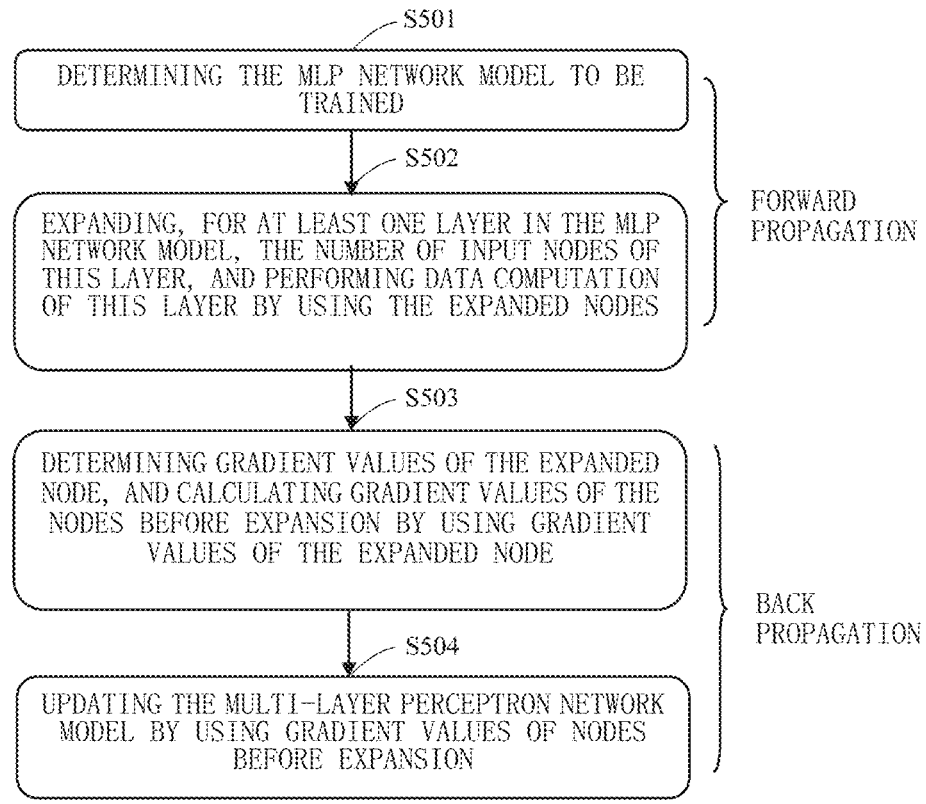
FIG. 19 is a flow schematic diagram of steps of a training method of the fifth exemplary embodiment of the present disclosure.

The fifth exemplary embodiment of the present disclosure describes the training method of another network model. Different from the first exemplary embodiment, the network model in the fifth embodiment is a multi-layer perceptron (MLP) network model, in which there is no transfer of feature maps, but nodes are transferred layer by layer. A flow schematic diagram of the method steps of the fifth exemplary embodiment of the present disclosure is described below with reference to FIG. 19.

Step S501: determining the MLP network model to be trained.

The step S501 is similar to the step S101 in the first exemplary embodiment, and the difference between them is that, the multi-layer neural network model here is an MLP network model.

Step S502: for at least one layer in the MLP network model to be trained, expanding the number of input nodes of this layer, and performing data computation of this layer by using the expanded nodes.

The expansion manner of the node number of this step S502 is similar to that of the number of the input feature maps in the first exemplary embodiment. Taking the replication manner shown in FIG. 20 as an example, it is assumed that the ith layer has three input nodes of the input node 1, the input node 2 and the input node 3, node 1' (as shown in dotted line of FIG. 20) is replicated from the node 1, node 2' is replicated from the node 2 and node 3' is replicated from the node 3, in a manner of replicating all nodes by 2 multiples. The expanded input nodes are computed with the connection coefficients to obtain the output node of the ith layer.

Figure 20:
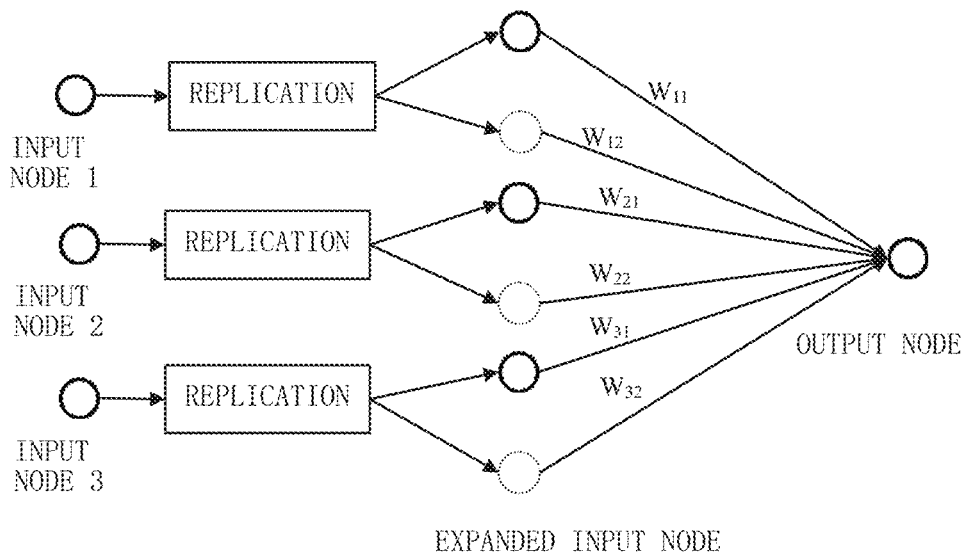
FIG. 20 is a schematic diagram of a convolution at a training stage of the fifth exemplary embodiment of the present disclosure.

FIG. 20 describes the process of expanding the number of input nodes in the present embodiment by taking the replication manner as an example, but the present embodiment is not limited to other manners, such as multiplication and addition operation of MLP network, previous layer expansion and hardware implementation, etc.

The above steps S501 and S502 are the forward propagation process in the fifth exemplary embodiment, and the corresponding back propagation process will be described next.

Step S503: determining gradient values of the expanded nodes, and calculating gradient values of the nodes before expansion by using the gradient values of the expanded nodes.

Step S504: updating the multi-layer perceptron network model by using the gradient values of the nodes before expansion.

Sixth Exemplary Embodiment

The sixth exemplary embodiment in the present disclosure is a method for applying the trained MLP network model based on manner of expanding input nodes, on the basis of the training method of the fifth exemplary embodiment. The application process of this embodiment is similar to that of the embodiment 2, and the difference between them is that, the present embodiment is an application in an MLP network model and the embodiment 2 is an application in a multi-layer neural network model.

In the present embodiment 6, the number of input nodes is expanded in at least one layer of the MLP network model by inputting data corresponding to task requirements to the trained MLP network model, and the expanded input nodes are computed with the corresponding connection coefficients until the application results are finally output. The relevant operation of expanding the number of input nodes in the embodiment 6, for example, the determination of in which layers the number of the input nodes is expanded, expansion multiple and expansion manners are the same as in the above embodiments 1 and 2, which are not repeatedly described here.

Seventh Exemplary Embodiment

The seventh exemplary embodiment of the present disclosure is also a method of applying the trained MLP network model based on the accumulation of the connection coefficients, on the basis of the training manner of the above fifth exemplary embodiment. The application process of this embodiment is similar to that of the embodiment 3, and the difference between them is that, the present embodiment is an application in the MLP network model and the embodiment 3 is an application in the multi-layer neural network model.

In the present embodiment 7, a preprocessing for the grouping accumulation of the connection coefficients is performed in the trained MLP network model, and the new accumulated connection coefficient is obtained for computation. It is assumed that the connection coefficients $W_{11}$ to $W_{32}$ shown in FIG. 20 are trained in the manner shown in FIG. 19. In this embodiment 7, the connection coefficients trained based on the same input node may be accumulated, i.e., $W_{11}$ and $W_{12}$ are accumulated as $W_{11\text{-}12}$, $W_{21}$ and $W_{22}$ are accumulated as $W_{21\text{-}22}$, $W_{31}$ and $W_{32}$ are accumulated as $W_{31\text{-}32}$. The input node 1 to the input node 3 are not expanded, but are directly computed with the accumulated connection coefficients $W_{11\text{-}12}$, $W_{21\text{-}22}$ and $W_{31\text{-}32}$ to perform the computation in this embodiment 7.

Similar to the above embodiment 3, the grouping accumulation processing of connection coefficients in the MLP network model may be the preprocessing before the application service starts. After the grouping accumulation of connection coefficients is completed, the required application service may be performed many times. Grouping accumulation of connection coefficients may also be performed during performing the application service and the present embodiment is not limited it.

Eighth Exemplary Embodiment

The eighth exemplary embodiment of the present disclosure may be a method of applying the trained network model based on the division of the connection coefficients, on the basis of the training manner of the above fifth exemplary embodiment or on the basis of the training in other manners. The application process of this embodiment is similar to that of the embodiment 4, and the difference between them is that, the present embodiment is an application in the MLP network model and the embodiment 4 is an application in the multi-layer neural network model.

In the network model applied by the present embodiment 8, values of connection coefficients are limited within the set value set, and before performing the application service of the present embodiment 8, the connection coefficients may be divided into more number, so that the input nodes after number expansion and the divided connection coefficients can be correctly computed, to execute the application computation of the present embodiment.

Similar to the above embodiment 4, the division processing of connection coefficients in the MLP network model may be the preprocessing before the application service starts. After the division of the connection coefficients is completed, the required application service may be performed many times. The division of the connection coefficients may also be performed during performing the application service and the present embodiment is not limited it.

Ninth Exemplary Embodiment

Figure 21:
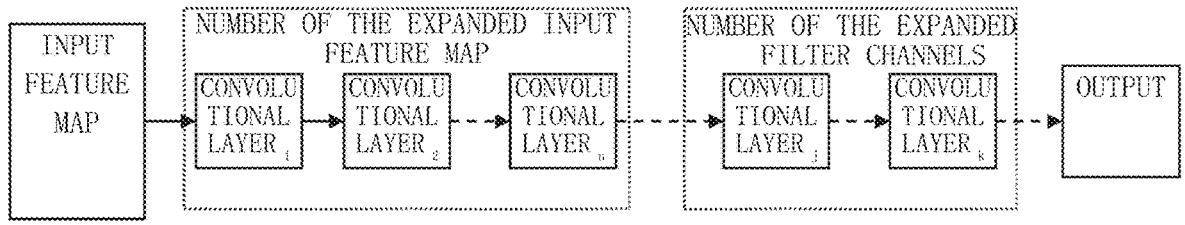
FIG. 21 is a schematic diagram of a network structure of the ninth exemplary embodiment of the present disclosure.

The ninth exemplary embodiment of the present disclosure describes a training method of multi-layer neural network model, and the difference between this training method and the training method of the embodiment 1 is that: in the forward propagation, there are not only layers where the number of input feature maps is expanded but also layers where the channel number of filters is expanded. FIG. 21 shows an example that an expansion of the feature maps is executed in the first n layers, and an expansion of filters is executed in last j to k layers. The benefit thereof is that the network model may be designed as a structure with fewer filter channels, and the number of filter channels may be expanded when the network model is actually running, so that the network model is in a concise state.

Figure 22:
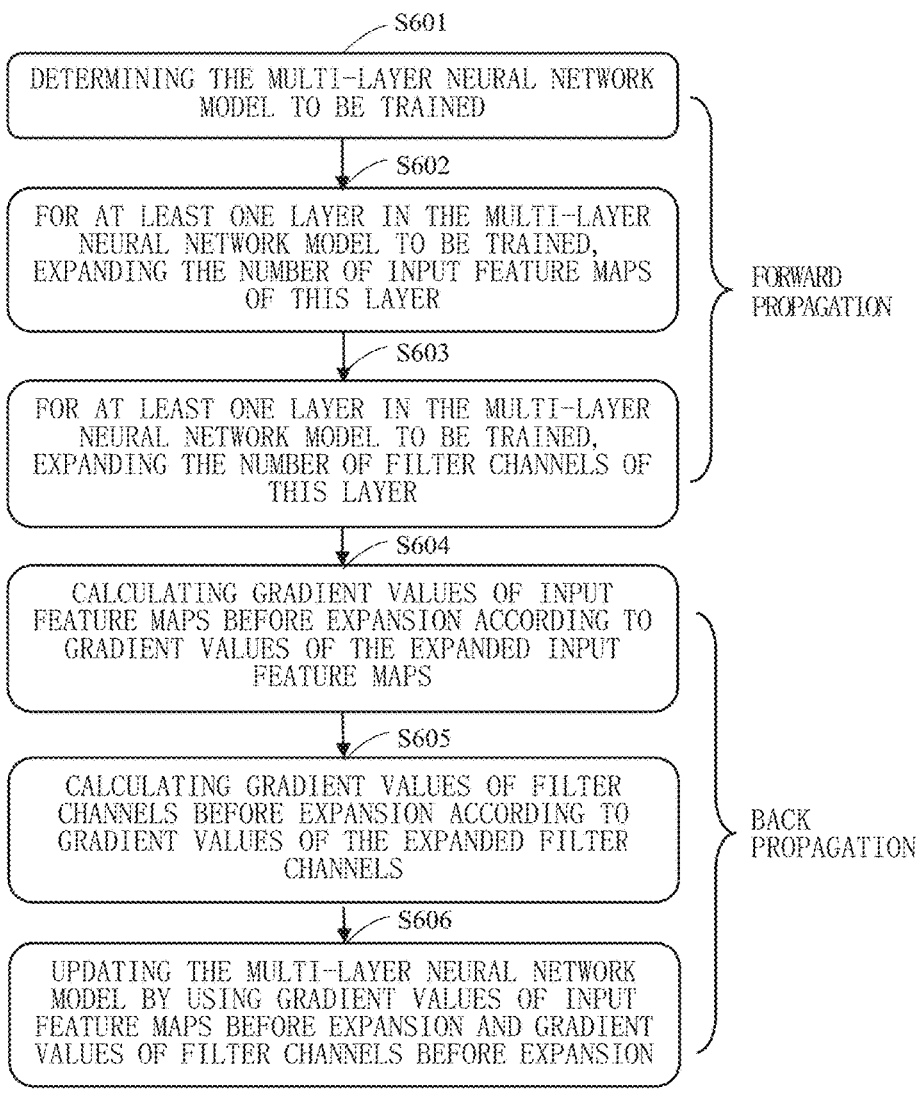
FIG. 22 is a flow schematic diagram of steps of a method of the ninth exemplary embodiment of the present disclosure.

In the present embodiment 9 is described by taking a case of expanding the number of input feature maps and the channel number of filters in different layers as examples. In one embodiment, the layer where the channel number of filters is expanded may be located behind the layer where input feature maps are expanded. The ninth exemplary embodiment of the present disclosure will be described in detail below with reference to FIG. 22.

Step S601: determining the multi-layer neural network model to be trained.

The step S601 is the same as the step S101 of the embodiment 1.

Step S602: for at least one layer in the multi-layer neural network model to be trained, expanding the number of input feature maps of this layer, and performing data computation by using the expanded input feature maps and the filter channels of this layer.

Herein, the manner of expanding the number of the input feature maps is identical to that in the embodiment 1, and will not be repeatedly described.

Step S603: for at least one layer in the multi-layer neural network model to be trained, expanding the number of filter channels of this layer, and performing data computation by using the expanded filter channels and the input feature maps of this layer.

Figure 23:
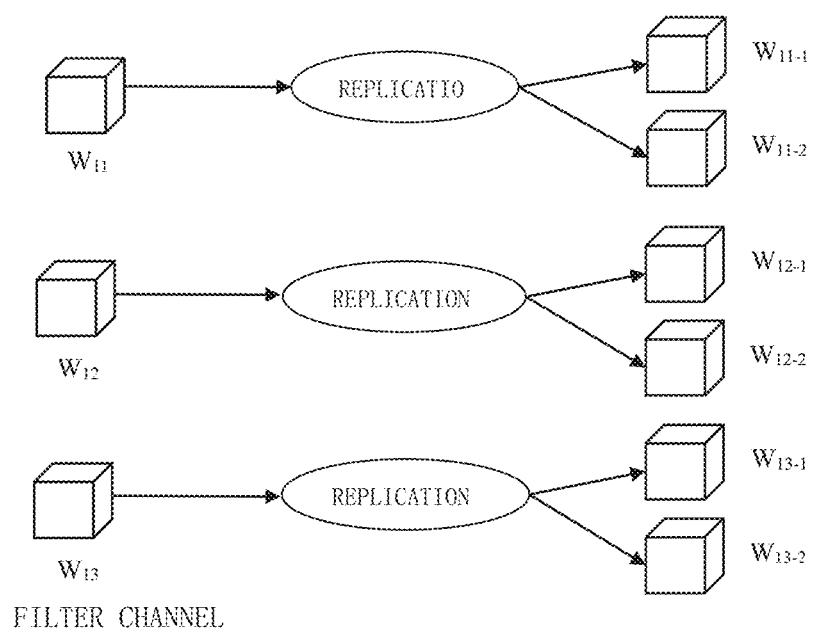
FIG. 23 is a schematic diagram of expanding the number of filter channels of the ninth exemplary embodiment of the present disclosure.

In this embodiment, there are many kinds of manner of expanding the number of filter channels, for example the expansion of the channel number is achieved by replicating the existing filter channels. FIG. 23 is an example of replicating the number of filter channels. Three channels of the filter are replicated as a whole (i.e., 2-multiple expansion) in a case where the row/column of the filter is kept unchanged to construct a filter with six channels. As can be seen from FIG. 23, since the channels are replicated as a whole, the channel $W_{11-1}$ and channel $W_{12-2}$ replicated from the channel $W_{11}$ are the same channels. The case for channel $W_{12}$ and channel $W_{13}$ are the same as channel $W_{11}$.

In addition to the regular expansion of each channel as shown in FIG. 23, the number of channels may also be expanded by manners of staggered expansion, unbalanced expansion, and staggered expansion+unbalanced expansion as shown in FIG. 10.

The above steps S601 and S603 are the forward propagation process of the training, wherein the orders of the steps S602 and S603 is unfixed. When data is running from top to bottom in the network model, any step in the steps S602 and S603 may be executed. After the end of forward propagation, back propagation is executed according to the results of the forward propagation to train the multi-layer neural network model. The back propagation process of this embodiment 9 will be described below.

Step S604: determining gradient values of the expanded input feature maps, and calculating gradient values of the input feature maps before expansion according to the gradient values of the expanded input feature maps.

Manners of calculating the gradient values of the input feature maps before expansion in the step S604 is the same as the manner in the embodiment 1, and will not be repeatedly described here.

Step S605: determining gradient values of the expanded filter channels, and calculating gradient values of the filter channels before expansion according to the gradient values of the expanded filter channels.

Since the number of filter channels has been expanded in the step S603, the gradient values of filter channels before expansion was calculated according to the gradient values of filter channels after expansion. An optional manner is to average the gradient values of the element at the same position for a plurality of channels expanded from the same channel, and then take the gradient average value as the gradient value at the corresponding position of the channel of the expansion source.

Step S606: updating the multi-layer neural network model by using the gradient values of the input feature maps before expansion and the gradient values of the filter channels before expansion.

Tenth Exemplary Embodiment

The solution of the ninth exemplary embodiment of the present disclosure is to execute the expansion of the number of the input feature maps and the expansion of the channel number of filters in different layers of the network model. Next, the tenth exemplary embodiment of the present disclosure discloses a solution of executing the expansion of the number of the input feature maps and the expansion of the channel number of filters in same layer of the network model.

Similar to the embodiment 9, in the forward propagation, the number of input feature maps and the channel number of filters are simultaneously expanded in the same layer, so that a data computation is performed on the expanded input feature maps and the expanded filter channels. In the back propagation, the gradient values of input feature maps before expansion and the gradient values of filter channels before expansion are calculated in the same layer, so as to update the network model.

It should be noted that, in addition to the cases where the number of input feature maps and the number of filter channels are expanded in the same layer or in different layers as the embodiment 9 and the embodiment 10, there may be also a case of combining the embodiment 9 and the embodiment 10, i.e., not only layers of simultaneously expanding the above two but also layers of only expanding one of the above two exist in the network model. The present disclosure is not limited to this.

Please note that after training the multi-layer neural network model with the training methods based on the ninth and tenth exemplary embodiments of the present disclosure, the application services for the trained network model may be executed. The application services may perform the expansions of the number of input feature maps and the number of filter channels at different layers as in the embodiment 9, or perform the expansions of the number of input feature maps and the number of filter channels at the same layer as in the embodiment 10, which are not extendedly described here.

Please note that the ninth and tenth exemplary embodiments of the present disclosure may also be applied to the MLP network model, which is not be repeatedly described here.

Eleventh Exemplary Embodiment

Figure 24:
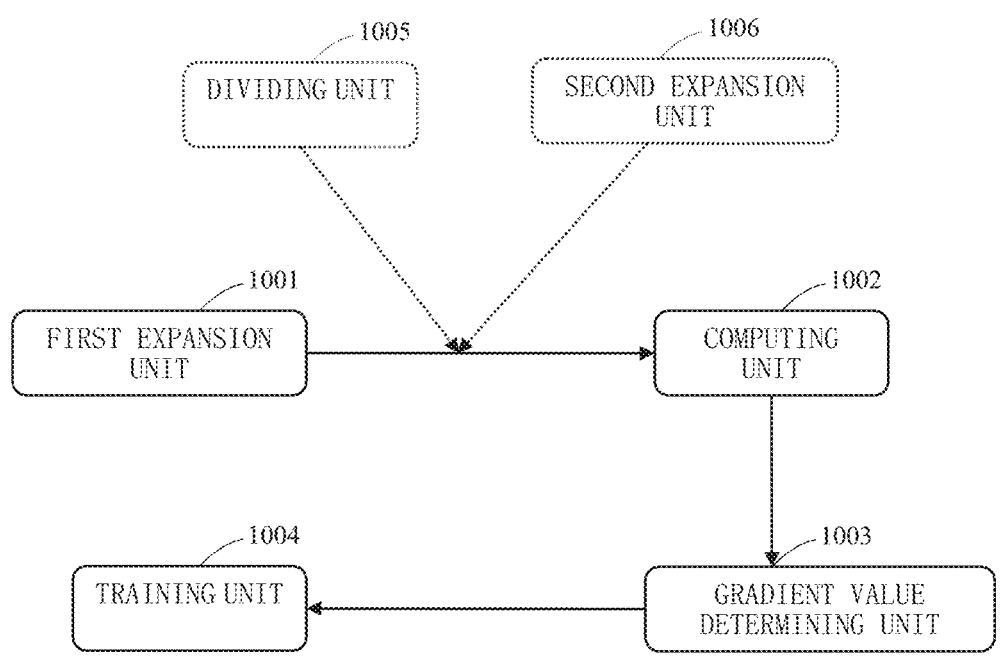
FIG. 24 is a schematic diagram of a training apparatus of a multi-layer neural network model of the eleventh exemplary embodiment of the present disclosure.

The eleventh exemplary embodiment of the present disclosure is a training apparatus of the multi-layer neural network model, which belongs to the same inventive concept as the first exemplary embodiment of the present disclosure. As shown in FIG. 24, the training apparatus includes a forward propagation part and a back propagation part, wherein the forward propagation part includes a first expansion unit 1001 and a computing unit 1002, the expansion unit 1001 is used to expand, for at least one layer of multi-layer neural network model to be trained, the number of input feature maps of the layer; the computing unit 1002 is used to perform data computation of the layer by using the expanded input feature maps. The back propagation part includes a gradient value determining unit 1003 and a training unit 1004, wherein the gradient value determining unit 1003 is used to determine the gradient values of the input feature maps before expansion by using the gradient values of the expanded input feature maps; the training unit 1004 is used to train the network model by using the gradient values of the input feature maps before expansion.

Specifically, the manner of expanding the number of input feature maps by the first expansion unit 1001 is the same as that described in embodiment 1 and will not be extendedly described here. The manner for determining the gradient values of the expanded input feature maps in the gradient value determining unit 1003 and the manner for calculating the gradient values of the input feature maps before expansion by using the gradient values of the expanded input feature maps are the same as that described in the embodiment 1. It is not extendedly described here.

As one optional scheme, the forward propagation part may also include a dividing unit 1005, as shown by the dotted line in FIG. 24, which is used to divide the filter channels in the layers where the number of input feature maps is expanded to obtain more number of the divided filter channels. The computing unit 1002 performs data computation on the expanded input feature maps and the divided filter channels. Here, the division process of the dividing unit 1005 is the same as that described in the embodiment 4 and will not be extendedly described here.

As another optional scheme, the forward propagation part may also include a second expansion unit 1006, as shown by the dotted line in FIG. 24, which is used to expand the number of filter channels in the layers where the number of input feature maps is expanded; Accordingly, the computing unit 1002 performs data computation on the expanded input feature maps and the expanded filter channels. According to difference among the designs of the actual network architectures, the function of the second expansion unit 1006 may also be different; for example, if filter channels are replicated in a layer different from a layer where the number of input feature maps is expanded, the second expansion unit 1006 expands the number of filter channels in the layer different from the layer where the number of input feature maps is expanded; at this point, the computing unit 1002 performs data computation on the input feature maps in the layer where the filter channels are expanded and the expanded filter channels. Regardless that the second expansion unit 1006 is to expand the number of input feature maps and the number of filter channels in the same layer or expand them in different layers, in the back propagation, the gradient value determining unit 1003 will determine the gradient values of the expanded filter channels, and calculate the gradient values of the filter channels before expansion according to the gradient values of the expanded filter channels, so that the training unit 1004 trains the network model by using the gradient values of the input feature maps before expansion and the gradient values of the filter channels before expansion.

Twelfth Exemplary Embodiment

Figure 25:
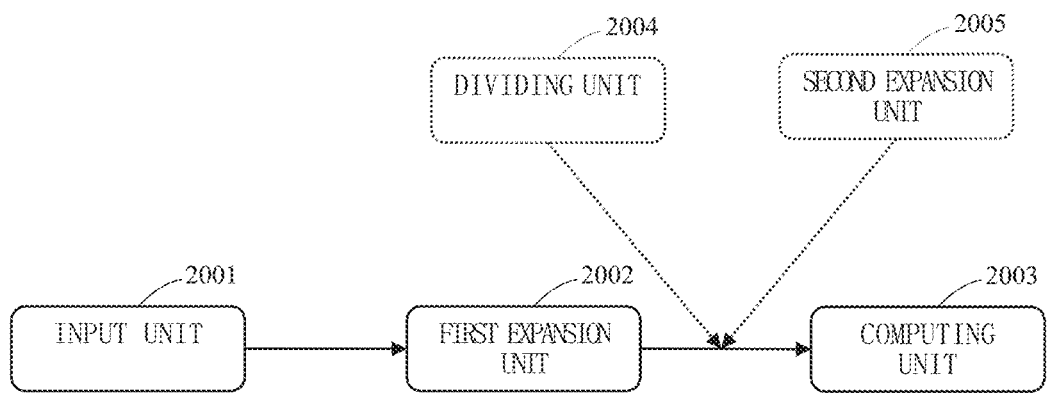
FIG. 25 is a schematic diagram of an application apparatus of a multi-layer neural network model of the twelfth exemplary embodiment of the present disclosure.

The twelfth exemplary embodiment of the present disclosure is an application apparatus which belongs to the same inventive concept as the application method of expanding the input feature maps of the second exemplary embodiment of the present disclosure. As shown in FIG. 25, the application apparatus includes an input unit 2001, a first expansion unit 2002, and a computing unit 2003, wherein the input unit 2001 is used to input data corresponding to task requirements to the multi-layer neural network model; The first expansion unit 2002 is used to expand, for at least one layer in the network model, the number of input feature maps of the layer; The computing unit 2003 is used to perform data computation of the layer by using the expanded input feature maps until the computations in the network model are completed.

Specifically, the manner of expanding the number of input feature maps by the first expansion unit 2002 is the same as that described in embodiment 1 and will not be extendedly described here.

As one optional scheme, the application apparatus may also include a dividing unit 2004, as shown by the dotted line in FIG. 25, which is used to divide the filter channels in layers where the number of input feature maps is expanded to obtain more number of the divided filter channels. The computing unit 2003 performs data computation on the expanded input feature maps and the divided filter channels. Here, the division process of the dividing unit 2004 is the same as that described in the embodiment 4 and will not be extendedly described here.

As another optional scheme, the application apparatus may also include a second expansion unit 2005, as shown by the dotted line in FIG. 25, which is used to expand the number of filter channels in the layers where the number of input feature maps is expanded; Accordingly, the computing unit 2003 performs data computation on the expanded input feature maps and the expanded filter channels. According to difference among the designs of the actual network architectures, the function of the second expansion unit 2005 may also be different; for example, if filter channels are expanded in a layer different from a layer where the number of input feature maps is expanded, the second expansion unit 2005 expands the number of filter channels in the layer different from the layer where the number of input feature maps is expanded; at this point, the computing unit 2003 performs data computation on the input feature maps in the layer where the filter channels are expanded and the expanded filter channels.

Thirteenth Exemplary Embodiment

Figure 26:
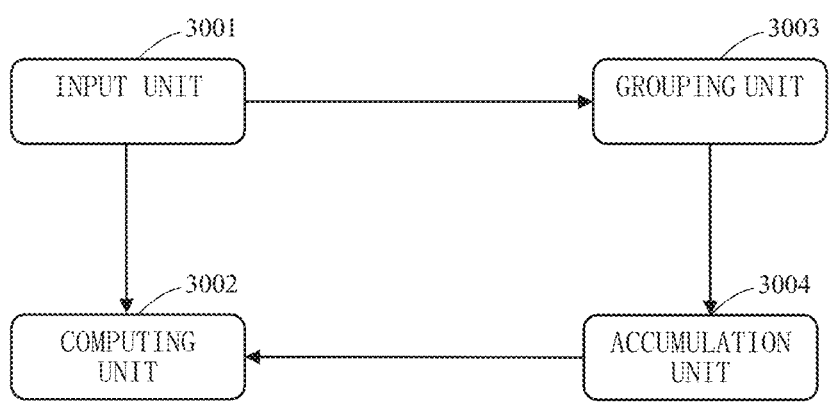
FIG. 26 is a schematic diagram of an application apparatus of a multi-layer neural network model of the thirteenth exemplary embodiment of the present disclosure.

The thirteenth exemplary embodiment of the present disclosure is an application apparatus which belongs to the same inventive concept as the application method of accumulating the filter channels of the third exemplary embodiment of the present disclosure. As shown in FIG. 26, the application apparatus includes an input unit 3001 and a computing unit 3002, wherein the input unit 3001 is used to input data corresponding to task requirements to the multi-layer neural network model; the computing unit 3002 performs computation of data in each layer from top to bottom in the network model; wherein, the application apparatus may also include: a grouping unit 3003 for dividing channels of the filter into groups, wherein the channels computed with the same input feature map during the training of the network model belong to the same group; an accumulation unit 3004 for accumulating the filter channels in the same group to obtain the accumulated filter channels for data computation with input feature maps. Wherein the grouping unit 3003 and the accumulation unit 3004 may be the preprocessing unit of the application apparatus, which performs a process of grouping and accumulating the filter channels for the network model in advance, and every time when the input unit 3001 receives data input externally, the computing unit 3002 performs a computation by using the network model for which the grouping and accumulation have been completed.

The present disclosure is also not limited to the training apparatus and application apparatus corresponding to the training method and application method about the MLP network model for the fifth exemplary embodiment to the eighth exemplary embodiment, which will not be extendedly described here.

Other Embodiments

Embodiment(s) of the present disclosure can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Embodiment(s) of the present disclosure can also be realized by a method of providing a software (program) that performs functions of the above embodiments to a system or apparatus through a network or various storage medium, and reading and executing the program by a computer or a central processing unit (CPU), a micro processing unit (MPU) and like of the system or apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A data processing method using a multi-layer neural network model comprising:
    inputting data to the multi-layer neural network model;
    setting at least one layer of the multi-layer neural network model in which a number of input feature maps is to be expanded and an expansion multiple of expanding the number of input feature maps;
    expanding, for the set at least one layer in the network model, a number of input feature maps of the determined at least one layer in accordance with the set expansion multiple by convolving at least one first filter; and
    computing the data in each layer of the network model,
    wherein data computation in the set at least one layer is convolution computation of the expanded input feature maps and second filters,
    wherein the at least one first filter has been updated based on gradient values of the expanded input feature maps in a back propagation in training of the multi-layer neural network model, and
    wherein data computation by using the expanded input feature maps comprises:
    reading out input feature maps before expansion a plurality of times and computing the data with each of the read out feature maps.

2. The data processing method according to claim 1, wherein the expanding the number of input feature maps, comprises:
    expanding the number of input feature maps by replicating the input feature maps before expansion.

3. The data processing method according to claim 1, wherein the expanding the number of input feature maps comprises:
    expanding each of the input feature maps by identical multiple sequentially.

4. The data processing method according to claim 1, wherein before inputting data to the multi-layer neural network model, the method further comprises:
    dividing, for the layer where the number of input feature maps is to be expanded, channels of filters, to obtain a larger number of the divided filter channels.

5. The data processing method according to claim 1, further comprises:
    expanding a number of the filter channels in layers different from the layer where the number of input feature maps is expanded; and
    performing data computation on the input feature maps in layers where the filter channels are expanded and the expanded filter channels.

6. The data processing method according to claim 1, wherein the number of input feature maps is expanded in at least one of first N convolutional layers in the network model, wherein N is a positive integer.

7. The data processing method according to claim 6, wherein a number of filter channels is expanded in at least one of the first N convolutional layers.

8. The data processing method according to claim 1, wherein the expanding the number of input feature maps comprises:
setting a plurality of identical filters for at least one of the input feature maps before expansion, respectively, and convoluting the input feature maps with the plurality of identical filters set therefor to obtain input feature maps after expansion.

9. The data processing method according to claim 1, wherein the expanding the number of input feature maps comprises:
setting filters in a previous convolutional layer of a layer where the number of input feature maps is to be expanded, wherein a number of the set filters is equal to the number of input feature maps after expansion and at least two of the set filters are identical filters, and outputting feature maps generated by using the set filters in the previous convolutional layer.

10. A data processing method using a multi-layer neural network model comprising:
inputting data to the multi-layer neural network model;
setting at least one layer of the multi-layer neural network model in which a number of input feature maps is to be expanded and an expansion multiple of expanding the number of input feature maps;
expanding, for the set at least one layer in the network model, a number of input feature maps of the determined at least one layer in accordance with the set expansion multiple by convolving at least one first filter; and
computing the data in each layer of the network model,
wherein data computation in the set at least one layer is convolution computation of the expanded input feature maps and second filters, wherein the at least one first filter has been updated based on gradient values of the expanded input feature maps in a back propagation in training of the multi-layer neural network model,
wherein the expanding the number of input feature maps comprises:
performing, in a regularization layer or a nonlinear transformation layer between the layer where the number of input feature maps is to be expanded and the previous convolutional layer thereof, computation of the current layer after input feature maps of the current layer have been replicated and outputting, or replicating and outputting feature maps after computation of the current layer has been performed.

11. The data processing method according to claim 1, wherein the expanding the number of input feature maps comprises:
expanding each of the input feature maps by identical multiple, wherein expansion orders are different.

12. The data processing method according to claim 1, wherein the expanding the number of input feature maps comprises:
expanding each of the input feature maps sequentially, wherein expansion multiples of at least two of input feature maps are different.

13. The data processing method according to claim 1, wherein the expanding the number of input feature maps comprises:
expanding each of the input feature maps sequentially, wherein expansion multiples of at least two of the input feature maps are different and expansion orders are different.

14. The data processing method according to claim 1, further comprises:
expanding, in the layer where the number of input feature maps is expanded, a number of the filter channels of the layer; and
performing data computation on the expanded input feature maps and the expanded filter channels.

15. A training method of training a multi-layer neural network model comprising:
setting at least one layer of the multi-layer neural network model to be trained in which a number of input feature maps is to be expanded and an expansion multiple of expanding the number of input feature maps;
expanding, for the set at least one layer of the multi-layer neural network model to be trained, a number of input feature maps of the set at least one layer in accordance with the set expansion multiple by convolving at least one first filter;
computing data in each layer of the network model in a forward propagation,
wherein data computation in the set at least one layer is convolution computation of the expanded input feature maps and second filters;
calculating gradient values of the expanded input feature maps in a back propagation and determining gradient values of the input feature maps before expansion by using the gradient values of the expanded input feature maps; and
training the at least one first filter of the network model by using the gradient values of the input feature maps before expansion, in the back propagation,
wherein data computation by using the expanded input feature maps comprises:
reading out input feature maps before expansion a plurality of times and computing the data with each of the read out feature maps.

16. The training method according to claim 15, wherein the expanding the number of input feature maps comprises:
expanding the number of input feature maps by replicating the input feature maps before expansion.

17. The training method according to claim 15, wherein the expanding the number of input feature maps, comprises:
expanding each of the input feature maps by identical multiple sequentially.

18. The training method according to claim 15, wherein the determining gradient values of input feature maps before expansion by using gradient values of the expanded input feature maps comprises:
averaging, for a plurality of input feature maps expanded from the same input feature map, gradient values at each position in the plurality of input feature maps and taking the gradient average value as gradient value at the position of an input feature map of an expansion source.

19. The training method according to claim 15, further comprising:
expanding, in a layer where the number of input feature maps is expanded, a number of filter channels of the layer in the forward propagation; and
performing data computation on the expanded input feature maps and the expanded filter channels.

20. The training method according to claim 19, further comprising:
calculating gradient values of filter channels before expansion by using gradient values of the expanded filter channels, and training the network model by using the gradient values of filter channels before expansion, in the back propagation.

21. The training method according to claim 15, further comprising:
expanding a number of filter channels in a layer different from the layer where the number of input feature maps is expanded in the forward propagation; and
performing data computation on the input feature maps in the layer where the filter channels are expanded and the expanded filter channels.

22. The training method according to claim 15, wherein the expanding the number of input feature maps comprises:
setting a plurality of identical filters for at least one of the input feature maps before expansion, respectively, and convoluting the input feature maps with the plurality of identical filters set therefor to obtain input feature maps after expansion.

23. The training method according to claim 15, wherein the expanding the number of input feature maps comprises:
setting filters in a previous convolutional layer of a layer where the number of input feature maps is to be expanded, wherein a number of the set filters is equal to the number of input feature maps after expansion and at least two of the set filters are identical filters, and outputting feature maps generated by using the set filters in the previous convolutional layer.

24. The training method according to claim 15, wherein the expanding the number of input feature maps comprises:
performing, in a regularization layer or a nonlinear transformation layer between the layer where the number of input feature maps is to be expanded and the previous convolutional layer thereof, computation of the current layer after input feature maps of the current layer have been replicated and outputting, or replicating and outputting feature maps after computation of the current layer has been performed.

25. The training method according to claim 15, wherein the data computation by using the expanded input feature maps comprises:
reading out input feature maps before expansion a plurality of times and computing the data with each of the read out feature maps.

26. The training method according to claim 15, wherein the expanding the number of input feature maps comprises:
expanding each of the input feature maps by identical multiple, wherein expansion orders are different.

27. The training method according to claim 15, wherein the expanding the number of input feature maps comprises:
expanding each of the input feature maps sequentially, wherein expansion multiples of at least two of the input feature maps are different.

28. The training method according to claim 15, wherein the expanding the number of input feature maps comprises:
expanding each of the input feature maps sequentially, wherein expansion multiples of at least two of the input feature maps are different and expansion orders are different.

29. A data processing apparatus using a multi-layer neural network model, the apparatus comprising:
one or more processors; and
one or more memories coupled to the one or more processors, the one or more memories having stored thereon instructions which, when executed by the one or more processors, cause the apparatus to:
input data to the multi-layer neural network model;
set at least one layer of the multi-layer neural network model in which a number of input feature maps is to be expanded and an expansion multiple of expanding the number of input feature maps;
expand, for the set at least one layer in the multi-layer neural network model, a number of input feature maps of the determined at least one layer in accordance with the set expansion multiple by convolving at least one first filter; and
compute the data in each layer of the network model,
wherein data computation in the set at least one layer is convolution computation of the expanded input feature maps and second filters,
wherein the at least one first filter has been updated based on gradient values of the expanded input feature maps in a back propagation in training of the multi-layer neural network model, and
wherein data computation by using the expanded input feature maps comprises:
reading out input feature maps before expansion a plurality of times and computing the data with each of the read out feature maps.

30. The application apparatus according to claim 29, wherein the instructions, when executed by the one or more processors, further cause the apparatus to:
expand, in a layer where the number of input feature maps is expanded, a number of filter channels of the layer; and
perform data computation on the expanded input feature maps and the expanded filter channels.

31. The application apparatus according to claim 29, wherein the instructions, when executed by the one or more processors, further cause the apparatus to:
expand a number of filter channels in a layer different from the layer where the number of input feature maps is expanded; and
perform data computation on the input feature maps in the layer where the filter channels are expanded and the expanded filter channels.

32. A training apparatus of training a multi-layer neural network model comprising:
one or more processors; and
one or more memories coupled to the one or more processors, the one or more memories having stored thereon instructions which, when executed by the one or more processors, cause the apparatus to:
set at least one layer of the multi-layer neural network model to be trained in which a number of input feature maps is to be expanded and an expansion multiple of expanding the number of input feature maps;
expand, for the set at least one layer of the multi-layer neural network model to be trained, a number of input feature maps of the set at least one layer in accordance with the set expansion multiple by convolving at least one first filter;
compute data in each layer of the network model in a forward propagation,
wherein data computation in the set at least one layer is convolution computation of the expanded input feature maps and second filters;
calculate gradient values of the expanded input feature maps in a back propagation and determine gradient values of the input feature maps before expansion by using gradient values of the expanded input feature maps; and
train the at least one first filter of the network model by using the gradient values of the input feature maps before expansion, in the back propagation,
wherein data computation by using the expanded input feature maps comprises:

reading out input feature maps before expansion a plurality of times and computing the data with each of the read out feature maps.

33. The training apparatus according to claim 32, wherein the instructions, when executed by the one or more processors, further cause the apparatus to:
expand, in the layer where the number of input feature maps is expanded, a number of filter channels of the layer; and
perform data computation on the expanded input feature maps and the expanded filter channels.

34. The training apparatus according to claim 32, wherein the instructions, when executed by the one or more processors, further cause the apparatus to:
expand a number of filter channels in a layer different from the layer where the number of input feature maps is expanded; and
perform data computation on the input feature maps in the layer where the filter channels are expanded and the expanded filter channels.

35. A non-transitory computer-readable storage medium storing instructions for causing a computer to perform data processing method using the multi-layer neural network model, the method comprising:
inputting data to the multi-layer neural network model;
setting at least one layer of the multi-layer neural network model in which a number of input feature maps is to be expanded and an expansion multiple of expanding the number of input feature maps;
expanding, for the set at least one layer in the network model, a number of input feature maps of the determined at least one layer in accordance with the set expansion multiple by convolving at least one first filter; and
computing the data in each layer of the network model,
wherein data computation in the set at least one layer is convolution computation of the expanded input feature maps and second filters,
wherein the at least one first filter has been updated based on gradient values of the expanded input feature maps in a back propagation in training of the multi-layer neural network model, and
wherein data computation by using the expanded input feature maps comprises:
reading out input feature maps before expansion a plurality of times and computing the data with each of the read out feature maps.

36. A non-transitory computer-readable storage medium storing instructions for causing a computer to perform a training method of training a multi-layer neural network model, the method comprising:
setting at least one layer of the multi-layer neural network model to be trained in which a number of input feature maps is to be expanded and an expansion multiple of expanding the number of input feature maps;
expanding, for the set at least one layer of the multi-layer neural network model to be trained, a number of input feature maps of the set at least one layer in accordance with the set expansion multiple by convolving at least one first filter;
computing data in each layer of the network model in a forward propagation,
wherein data computation in the set at least one layer is convolution computation of the expanded input feature maps and second filters;
calculating gradient values of the expanded input feature maps in a back propagation and determining gradient values of the input feature maps before expansion by using the gradient values of the expanded input feature maps; and
training the at least one first filter of the network model by using the gradient values of the input feature maps before expansion, in the back propagation,
wherein data computation by using the expanded input feature maps comprises:
reading out input feature maps before expansion a plurality of times and computing the data with each of the read out feature maps.

* * * * *